(12) United States Patent
Armpriester et al.

(10) Patent No.: US 11,189,141 B2
(45) Date of Patent: Nov. 30, 2021

(54) UNIVERSAL THREAT AWARENESS MANAGEMENT SYSTEM FOR OCCUPANT SAFETY

(71) Applicants: Charles Armpriester, Weston, FL (US); Michael Swackhammer, Starke, FL (US)

(72) Inventors: Charles Armpriester, Weston, FL (US); Michael Swackhammer, Starke, FL (US)

( * ) Notice: Subject to any disclaimer, the term of this patent is extended or adjusted under 35 U.S.C. 154(b) by 0 days.

(21) Appl. No.: 16/814,822

(22) Filed: Mar. 10, 2020

(65) Prior Publication Data
US 2020/0372768 A1 Nov. 26, 2020

Related U.S. Application Data

(60) Provisional application No. 62/852,561, filed on May 24, 2019.

(51) Int. Cl.
| | |
|---|---|
| *G08B 7/06* | (2006.01) |
| *G08B 5/38* | (2006.01) |
| *H04W 4/90* | (2018.01) |
| *G08B 21/02* | (2006.01) |
| *G08B 3/00* | (2006.01) |

(52) U.S. Cl.
CPC ............... *G08B 7/062* (2013.01); *G08B 3/00* (2013.01); *G08B 5/38* (2013.01); *G08B 21/02* (2013.01); *H04W 4/90* (2018.02)

(58) Field of Classification Search
CPC . G08B 7/062; G08B 3/00; G08B 5/38; G08B 21/02; H04W 4/90
See application file for complete search history.

(56) References Cited

U.S. PATENT DOCUMENTS

| | | | | |
|---|---|---|---|---|
| 4,155,042 A | | 5/1979 | Permut et al. | |
| 5,565,843 A | * | 10/1996 | Meyvis | G08B 5/36 340/326 |
| 5,710,543 A | * | 1/1998 | Moore | G08B 5/36 340/691.7 |
| 6,104,428 A | * | 8/2000 | Lu | G08B 13/19645 348/159 |
| 6,114,948 A | * | 9/2000 | Astell | G08B 5/36 340/286.05 |
| 6,762,686 B1 | * | 7/2004 | Tabe | G08B 25/08 340/541 |
| 6,809,642 B1 | * | 10/2004 | Brenner | G08B 7/062 340/3.1 |

(Continued)

*Primary Examiner* — Curtis J King
(74) *Attorney, Agent, or Firm* — Sanchelima & Associates, P.A.; Christian Sanchelima; Jesus Sanchelima

(57) ABSTRACT

A universal threat awareness management system for occupant safety has a primary interface device that is positioned with a secured location. The interface device enables an authorized individual to monitor and manage an entire facility for hazardous situations. The system also has audio output devices, visual output devices, and environmental sensors. The audio output devices, visual output devices, and environmental sensors are positioned external to the secured location and enable the authorized individual to monitor and communicate with other people within and around the facility. The system is intended to be used as a campus-wide threat mitigation platform.

20 Claims, 20 Drawing Sheets

(56) References Cited

U.S. PATENT DOCUMENTS

| | | | |
|---|---|---|---|
| 7,425,946 B1* | 9/2008 | Britton | G06F 1/3203 345/156 |
| 8,138,928 B2* | 3/2012 | Farley | G08B 5/36 340/577 |
| 8,653,963 B2 | 2/2014 | Vallaire | |
| 9,286,790 B2 | 3/2016 | Lyman et al. | |
| 9,354,619 B2 | 5/2016 | Ergenbright | |
| 9,679,467 B2 | 6/2017 | Hibbs, Jr. | |
| 9,959,747 B1* | 5/2018 | Zupan | H04R 3/005 |
| 10,726,696 B1* | 7/2020 | DeLintt | G08B 21/02 |
| 10,769,902 B1* | 9/2020 | Kronz | H04W 4/38 |
| 2003/0190906 A1* | 10/2003 | Winick | G08B 25/008 455/404.1 |
| 2003/0234725 A1* | 12/2003 | Lemelson | G08B 29/186 340/521 |
| 2003/0234731 A1* | 12/2003 | Rhodes | G08B 17/10 340/870.09 |
| 2004/0145498 A1* | 7/2004 | Carroll | B64D 45/0015 340/945 |
| 2004/0257216 A1* | 12/2004 | Parker | G08B 29/18 340/507 |
| 2005/0212677 A1* | 9/2005 | Byrne | G08B 7/062 340/574 |
| 2005/0231349 A1* | 10/2005 | Bhat | G08B 25/08 340/506 |
| 2005/0242944 A1* | 11/2005 | Bankert | G08B 25/00 340/531 |
| 2005/0275549 A1* | 12/2005 | Barclay | G08B 13/1966 340/628 |
| 2006/0017565 A1* | 1/2006 | Addy | H04N 7/18 340/539.14 |
| 2006/0226972 A1* | 10/2006 | Smith | G08B 13/2482 340/539.1 |
| 2007/0008099 A1* | 1/2007 | Kimmel | G08B 13/19656 340/506 |
| 2010/0043319 A1* | 2/2010 | Bennett | E04D 1/30 52/173.3 |
| 2010/0090856 A1* | 4/2010 | Chen | G08B 7/062 340/691.6 |
| 2010/0102983 A1* | 4/2010 | Plocher | G08B 25/012 340/691.6 |
| 2011/0040877 A1* | 2/2011 | Foisy | H04L 41/0893 709/226 |
| 2011/0187543 A1* | 8/2011 | Russo | G08B 17/10 340/628 |
| 2011/0286590 A1* | 11/2011 | Foisy | G08B 29/06 379/100.17 |
| 2011/0298616 A1* | 12/2011 | Foisy | G08B 29/06 340/540 |
| 2012/0126700 A1* | 5/2012 | Mayfield | H05B 47/19 315/86 |
| 2012/0139718 A1* | 6/2012 | Foisy | G08B 25/012 340/531 |
| 2012/0282974 A1* | 11/2012 | Green | H04W 4/12 455/550.1 |
| 2013/0027197 A1* | 1/2013 | Foisy | G08B 25/014 340/506 |
| 2013/0054033 A1* | 2/2013 | Casilli | H04L 12/282 700/276 |
| 2013/0257626 A1* | 10/2013 | Masli | G08B 13/19613 340/691.6 |
| 2013/0261804 A1* | 10/2013 | Casilli | G05B 15/02 700/276 |
| 2014/0015667 A1* | 1/2014 | Kolb | G06F 11/0745 340/501 |
| 2014/0340222 A1* | 11/2014 | Thornton | G08B 7/062 340/539.17 |
| 2015/0179039 A1* | 6/2015 | Miwa | H04W 64/00 340/573.1 |
| 2015/0287295 A1* | 10/2015 | Trivelpiece | G08B 13/00 340/6.1 |
| 2015/0296188 A1* | 10/2015 | Meganathan | G08B 13/19682 348/143 |
| 2015/0339913 A1* | 11/2015 | Lyman | G09B 5/04 340/287 |
| 2015/0348220 A1* | 12/2015 | Sharma | G08B 7/066 705/324 |
| 2015/0348399 A1* | 12/2015 | Cree | G06F 3/0488 340/514 |
| 2016/0007179 A1* | 1/2016 | Kim | G08B 7/066 455/404.1 |
| 2016/0027266 A1* | 1/2016 | McDonagh | G08B 7/066 340/815.4 |
| 2016/0247369 A1* | 8/2016 | Simmons | G08B 7/066 |
| 2016/0266556 A1* | 9/2016 | Pearson | G06F 30/13 |
| 2016/0284174 A1* | 9/2016 | Connell, II | G08B 7/062 |
| 2017/0018154 A1* | 1/2017 | Wen | G08B 27/001 |
| 2017/0352257 A1* | 12/2017 | Oliver | G08B 27/005 |
| 2018/0050226 A1* | 2/2018 | Park | A62B 3/00 |
| 2018/0089775 A1* | 3/2018 | Frey | G06Q 50/163 |
| 2018/0197402 A1* | 7/2018 | Zribi | G08B 7/06 |
| 2018/0211512 A1* | 7/2018 | Zribi | G08B 21/02 |
| 2018/0227141 A1* | 8/2018 | Zribi | H04L 12/2825 |
| 2018/0356241 A1* | 12/2018 | Correnti | G01C 21/3461 |
| 2019/0130723 A1* | 5/2019 | Thiel | E05C 17/184 |
| 2019/0295207 A1* | 9/2019 | Day | G06Q 90/205 |
| 2019/0295386 A1* | 9/2019 | Roberts | H02J 9/065 |
| 2019/0295397 A1* | 9/2019 | Eckert | G08B 15/00 |
| 2019/0318611 A1* | 10/2019 | Gravel | H04W 4/026 |
| 2020/0098209 A1* | 3/2020 | Zilka | G07C 9/00563 |
| 2020/0126400 A1* | 4/2020 | Larsson | H04W 4/90 |
| 2020/0168068 A1* | 5/2020 | Lyman | G08B 19/005 |
| 2020/0175842 A1* | 6/2020 | Merjanian | G06T 11/60 |
| 2020/0226892 A1* | 7/2020 | Coles | G08B 25/14 |
| 2020/0349827 A1* | 11/2020 | Joshi | G09F 13/04 |
| 2020/0357309 A1* | 11/2020 | Paolini, Jr. | G09F 9/372 |
| 2020/0371496 A1* | 11/2020 | Abdeldaim | H04L 61/2007 |

\* cited by examiner

UNIVERSAL THREAT AWARENESS MANAGEMENT SYSTEM FOR OCCUPANT SAFETY

The current application claims a priority to the U.S. Provisional Patent application Ser. No. 62/852,561 filed on May 24, 2019.

FIELD OF THE INVENTION

The present invention relates generally to emergency response systems. More specifically, the present invention relates to a system that enables an authorized individual to monitor an entire structure for credible threats and then initiate a lockdown condition when said threats are identified. In addition to manual activation, the system of the present invention can also be activated automatically by Environmental sensors and will instantly begin predetermined lockdown protocols and notification to the structure occupants through alert alarms, messaging and color-coded notification lights. The present invention is designed to provide multiple authorized individuals a network of real-time information as required to inform/prepare structure occupants, unify 1st responders and safety teams to mitigate and recover from critical incidents.

BACKGROUND OF THE INVENTION

Law enforcement personnel have been working hard developing strategies to best deal with emergency events involving mass shootings at soft target occupancies containing large volumes of people such as shopping malls, sporting events, educational facilities, hospitals, grocery stores, movie theaters, transportation hubs, convention centers, etc. Often the perpetrators are armed with high-capacity assault weapons capable of inflicting mass casualties in a short period of time. Time being a critical factor, an integrated system that would notify all occupants instantly and simultaneously at the earliest suspicion of a perceived threat would provide a significant defense against such events. To be able to precisely identify the exact location where the perceived or actual threat exists would be very beneficial.

An objective of the present invention is to provide a system designed to protect and notify occupants within various facilities during critical incidents. The present invention provides real-time life-safety notifications to all facility occupants before, during, and after an emergency or mass casualty incident. The present invention comprises a system designed to respond to multiple types of internal/external emergencies including, but not limited to, bomb threats, fire/explosion and chemical threats. The present invention provides a unique visual notification system corresponding to different emergency situations. The visual notification systems can include notifications for lockdown, shelter-in-place, and/or evacuation of select buildings, floors or zones depending on the threat or critical incident. This Threat Awareness Management System provides protection through the use of ballistic acoustical sensors, flame, radiation, chemical and Carbon Monoxide detection sensors. In addition, the visual notification system can provide the means to evacuate specific areas/zones of the building depending on type of threat. The real-time notifications can provide first responders specific location addresses, text messaging, digital mapping as well as building status to enhance navigation to mitigate emergencies. The present invention provides a state-of-the-art technology to be utilized in the designated Command Center during ICS activation. The system of the present invention complements Florida's Senate Bill SB7026, SB7030, SS1006.12, existing fire safety systems, as well as established best practices for active shooter, preparedness, response, and recovery for critical incidents.

DETAIL DESCRIPTIONS OF THE INVENTION

All illustrations of the drawings are for the purpose of describing selected versions of the present invention and are not intended to limit the scope of the present invention.

Figure 1:
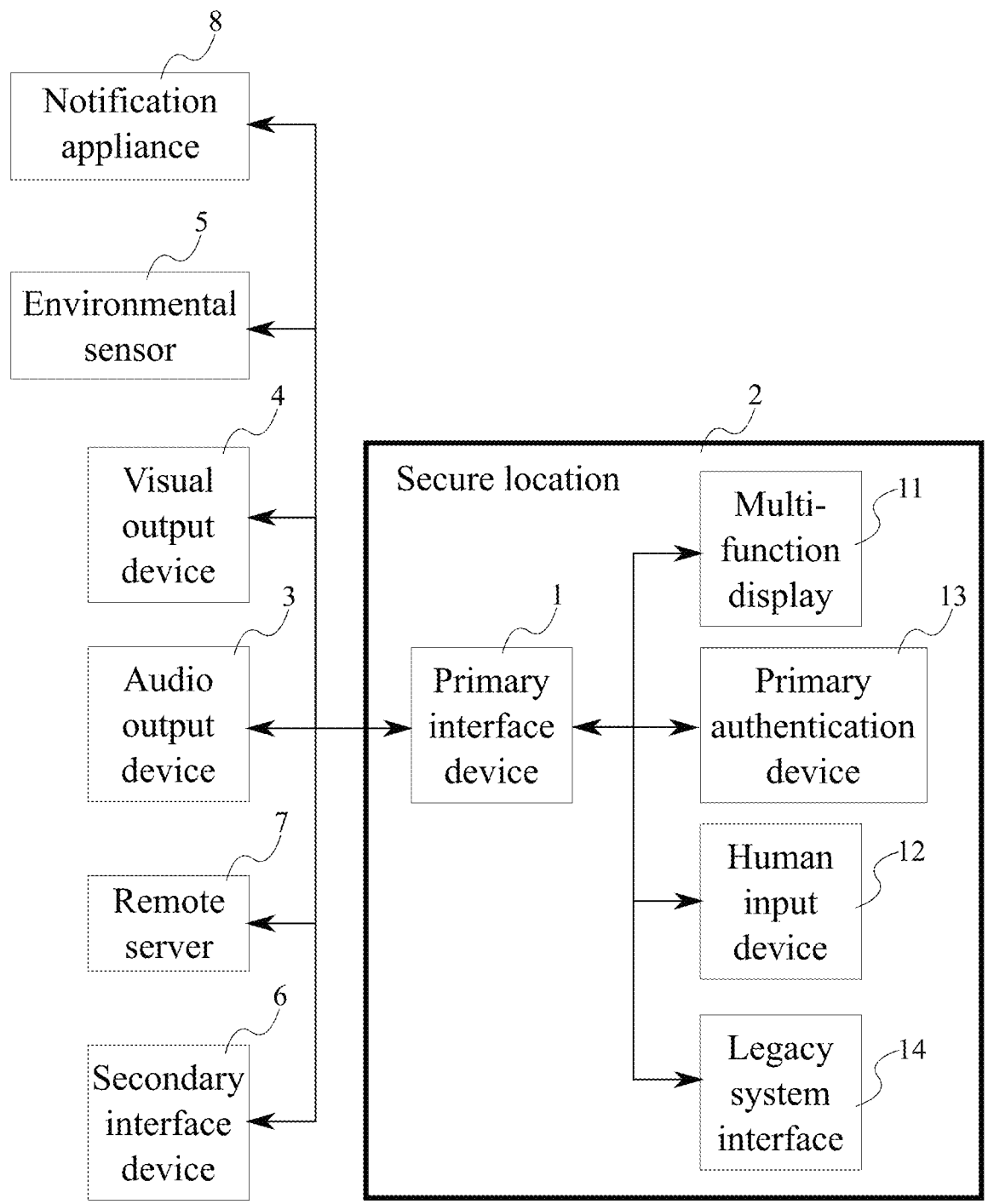
FIG. 1 is a system diagram illustrating the connections between components of the present invention relative to a secured location.
Figure 2:
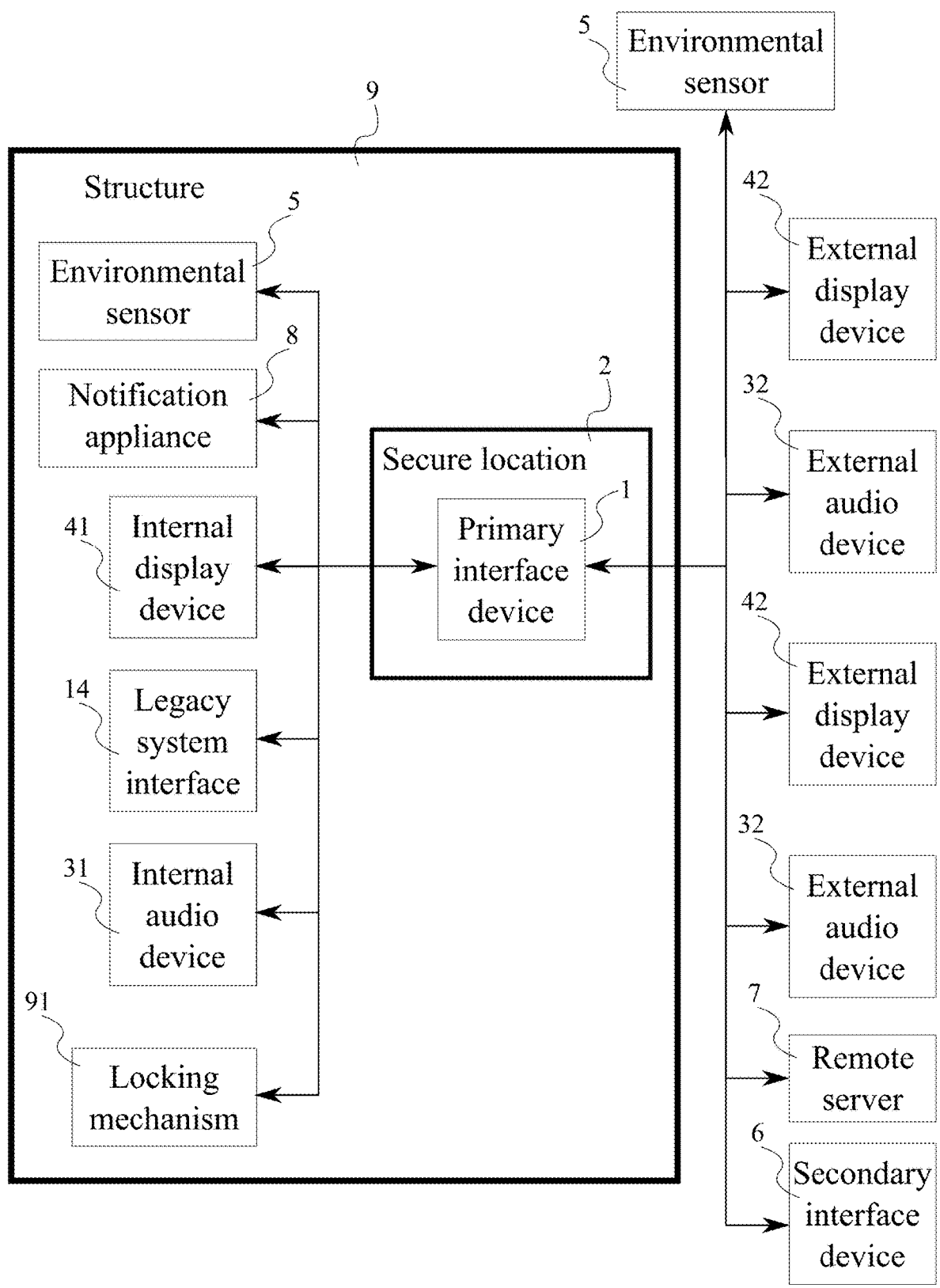
FIG. 2 is a system diagram illustrating the connections between components of the present invention relative to a structure.
Figure 3:
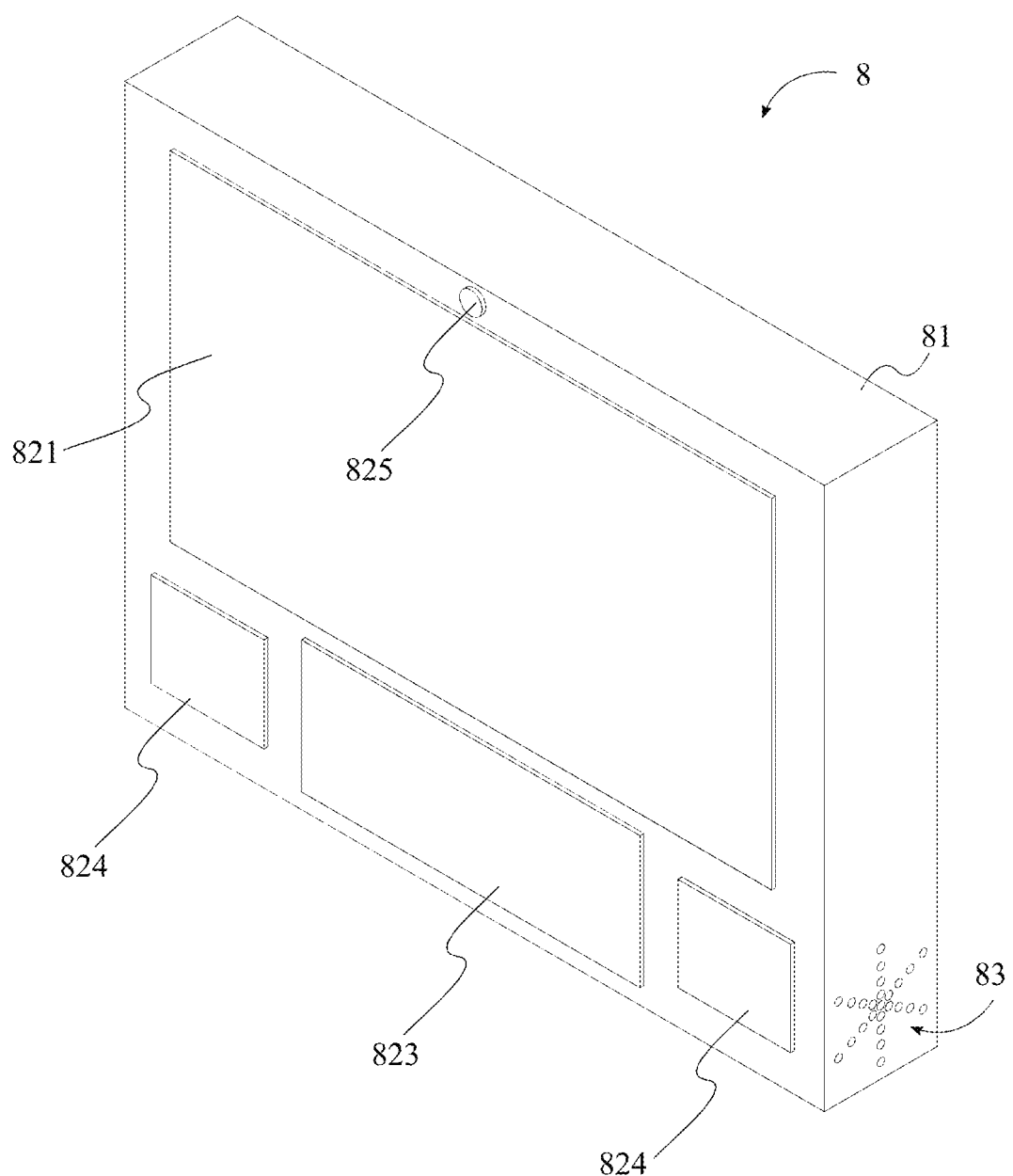
FIG. 3 is a perspective view of one embodiment of a notification appliance used in the present invention.
Figure 4:
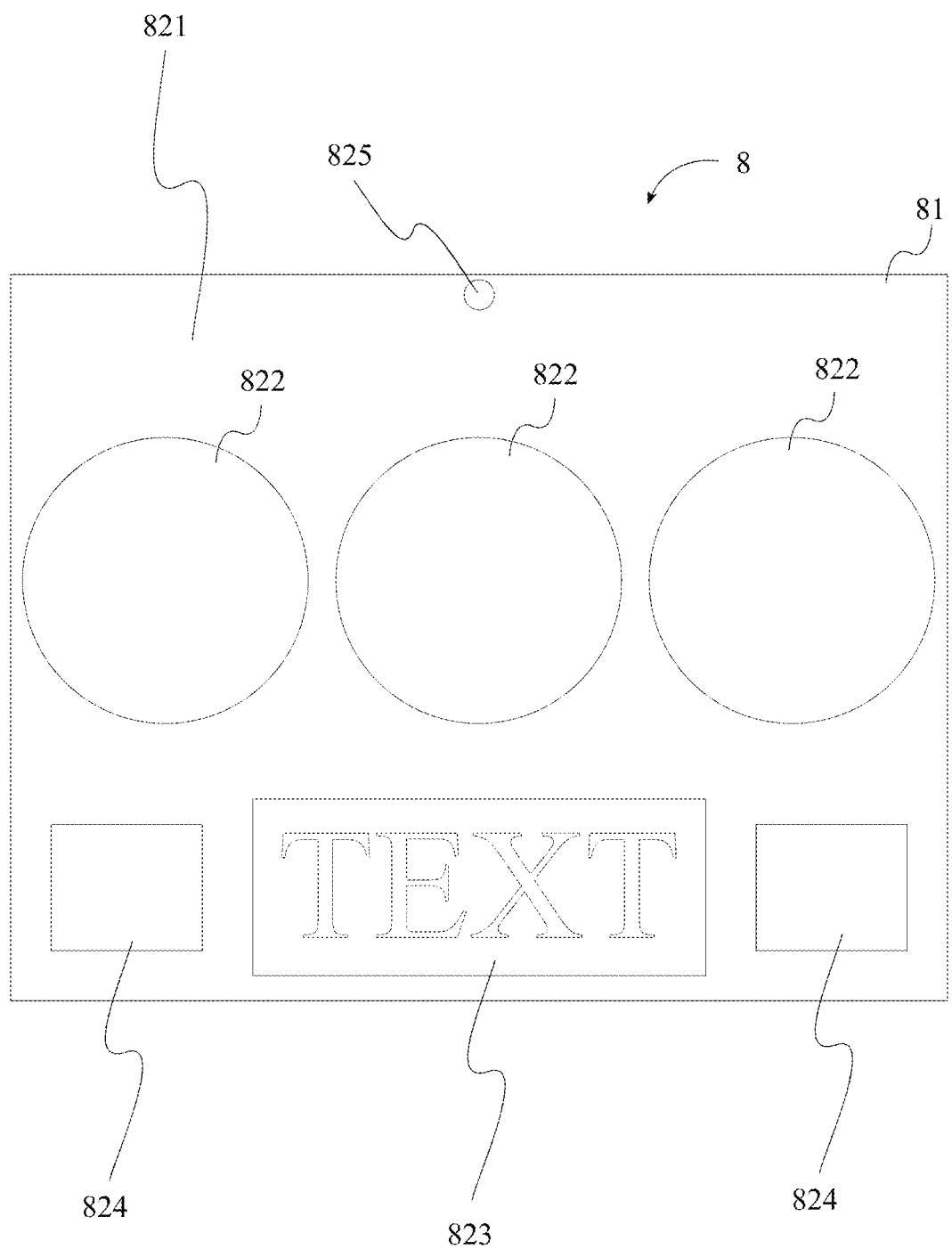
FIG. 4 is a front view of one embodiment of the notification appliance used in the present invention. In this embodiment, a series of color-coded notification lights is distributed across the notification appliance.
Figure 5:
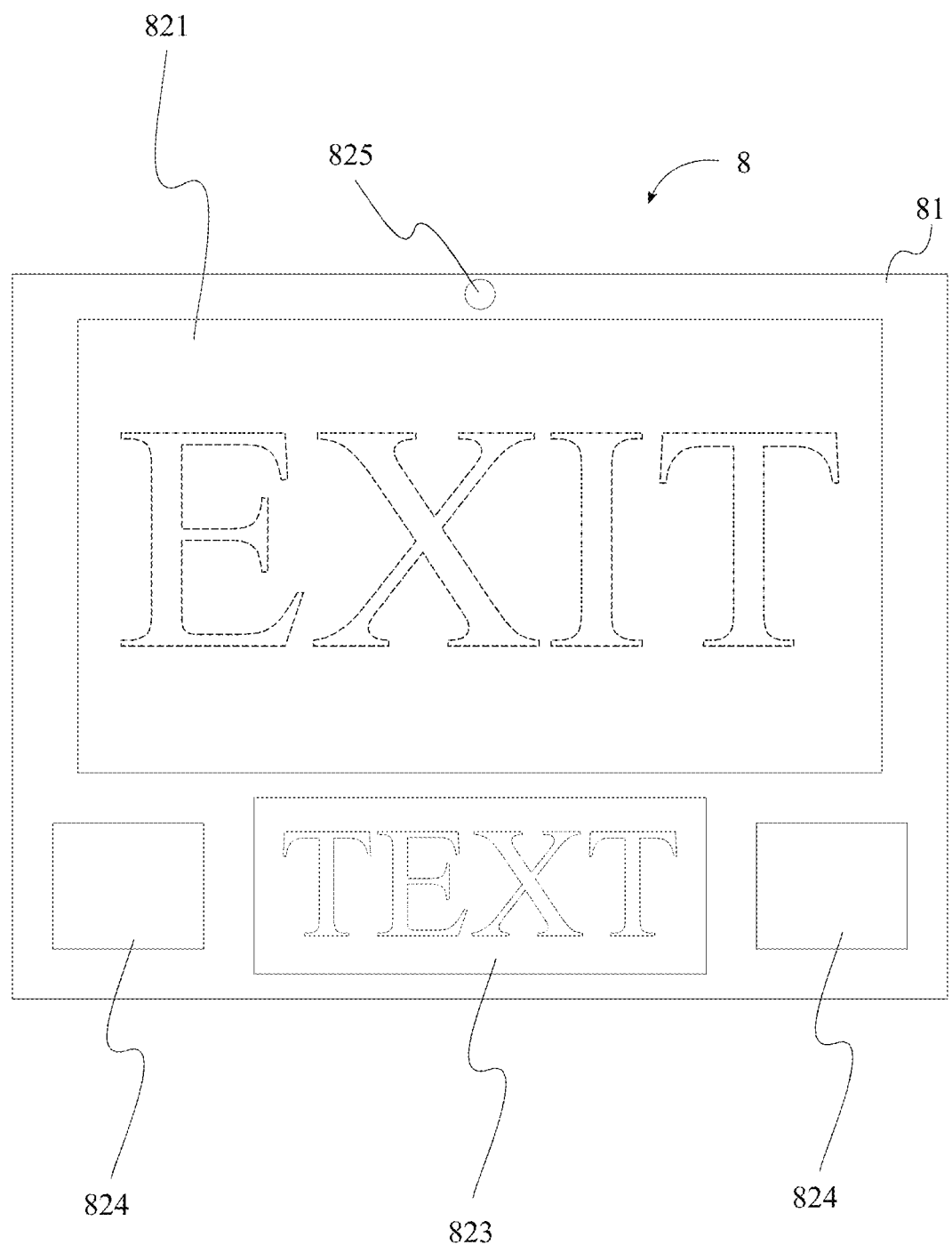
FIG. 5 is a front view of one embodiment of the notification appliance used in the present invention. In this embodiment, the display screen is formed into an exit sign.
Figure 6:
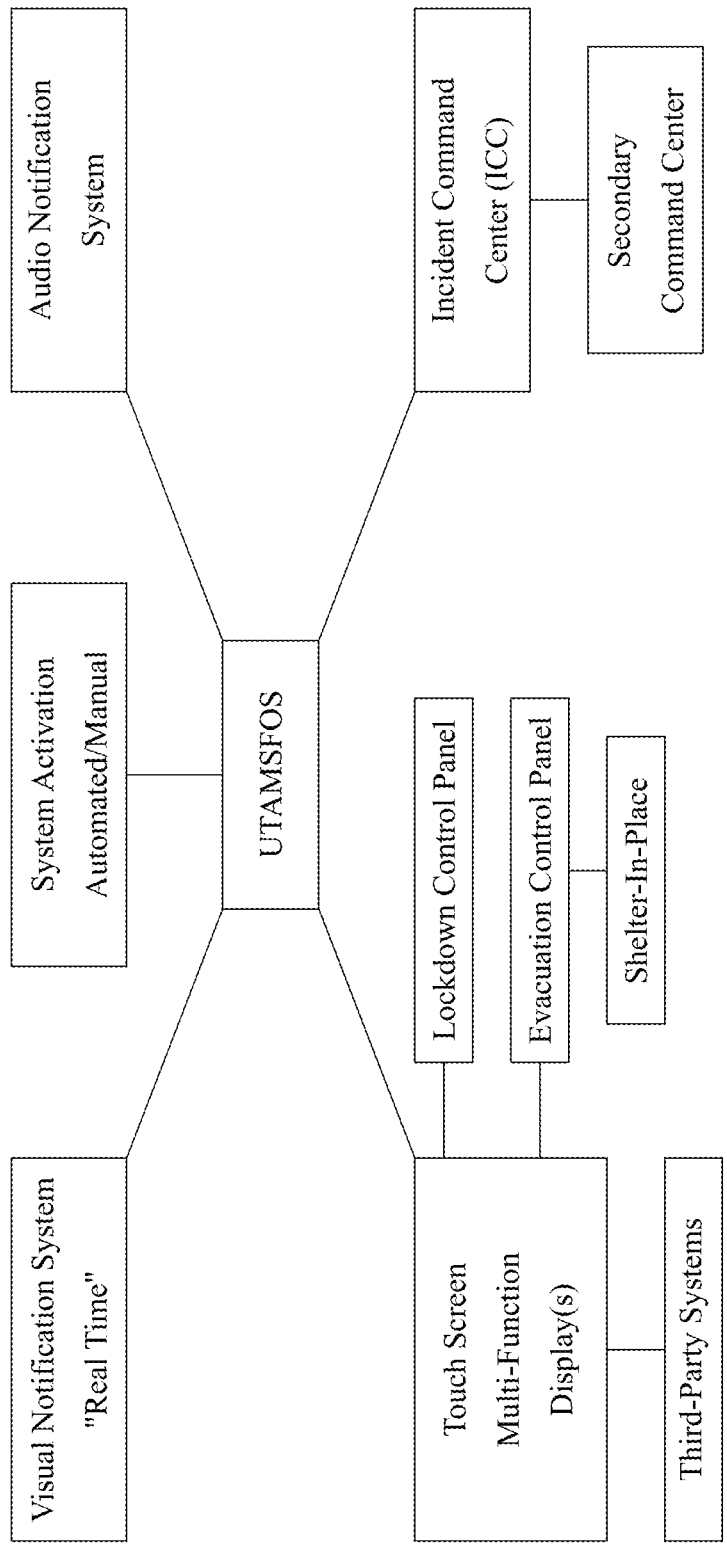
FIG. 6 is a diagram illustrating the present invention implemented as a Universal Threat Awareness Management System for Occupant Safety (UTAMSFOS).
Figure 7:
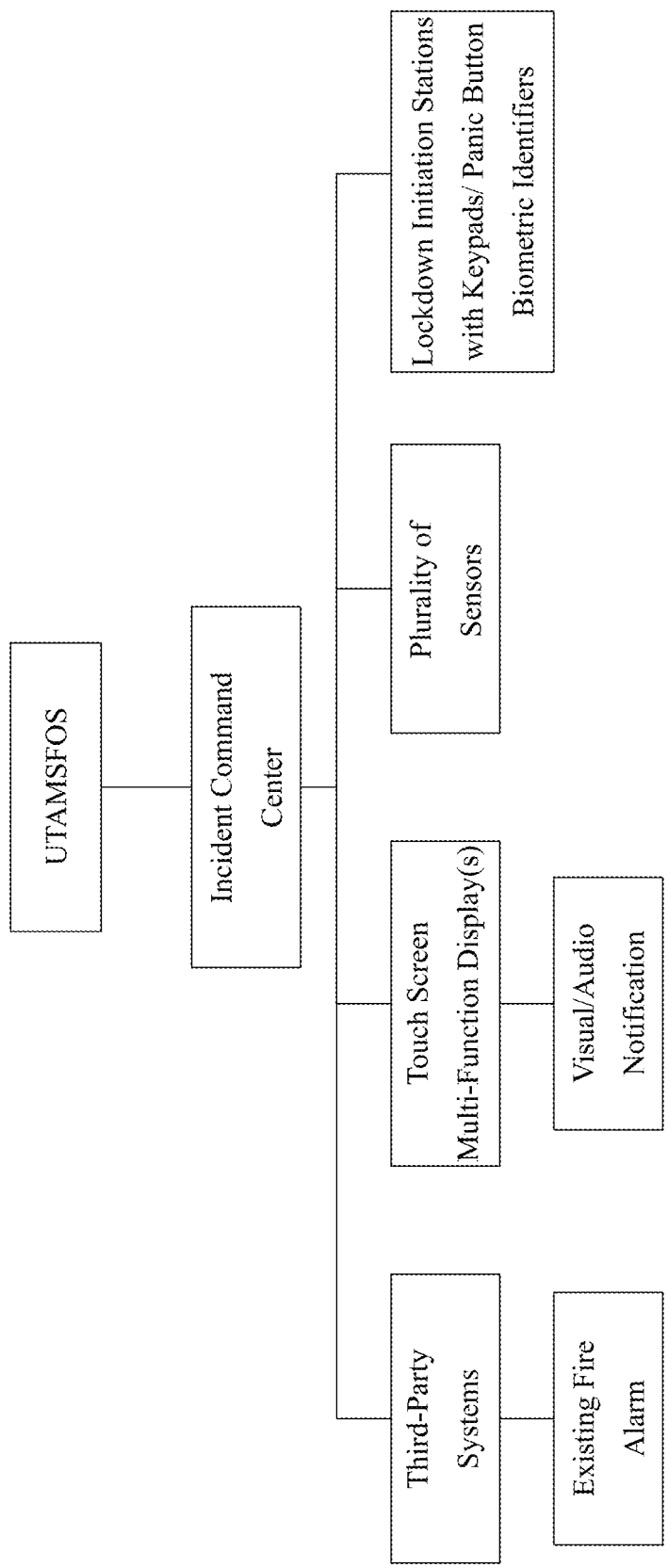
FIG. 7 is a diagram of the present invention illustrating the connectivity between the plurality of modules of the UTAMSFOS.
Figure 8:
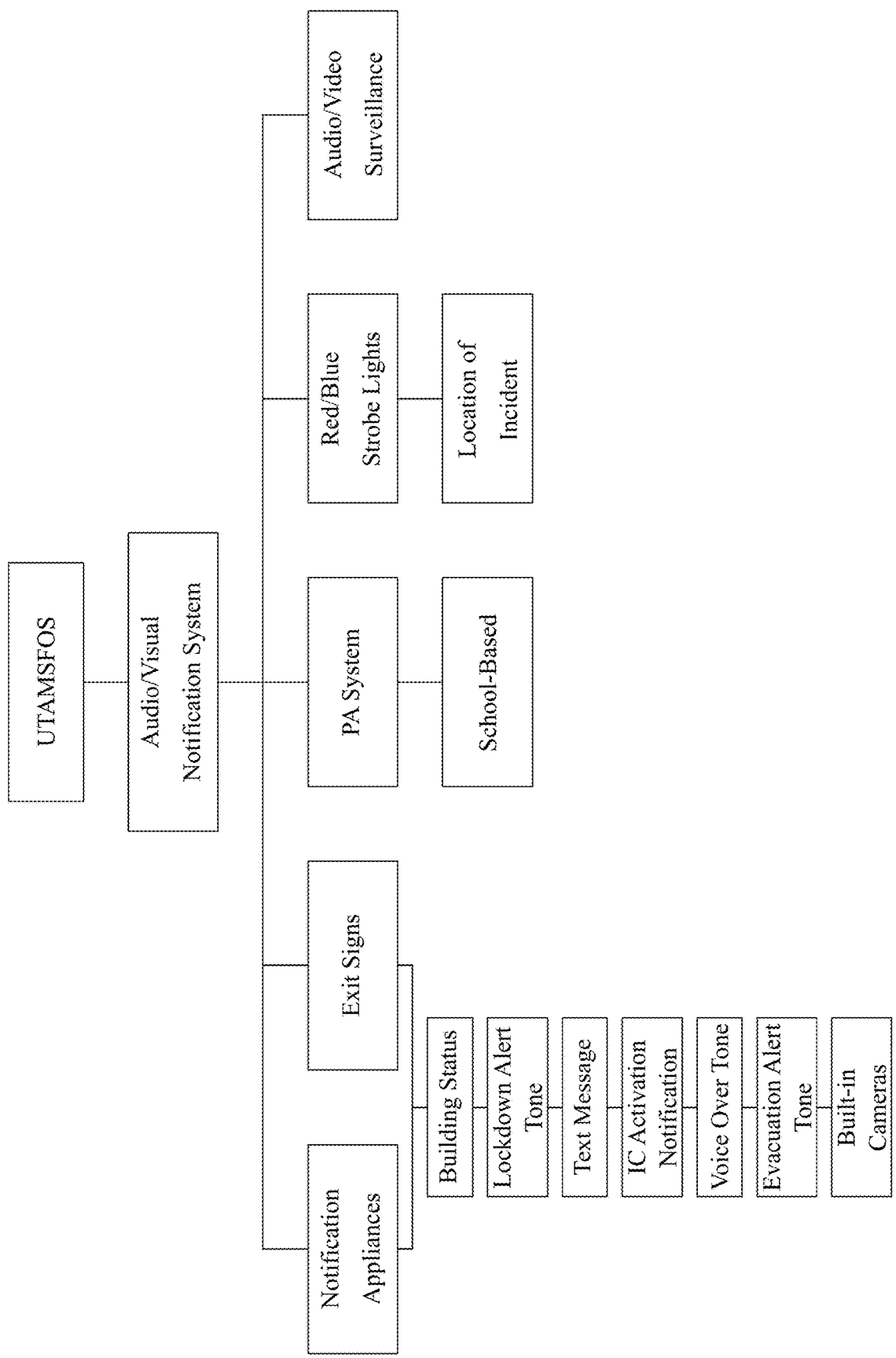
FIG. 8 is a diagram of the present invention illustrating the plurality of components of the audio/visual notification system of the UTAMSFOS.
Figure 9:
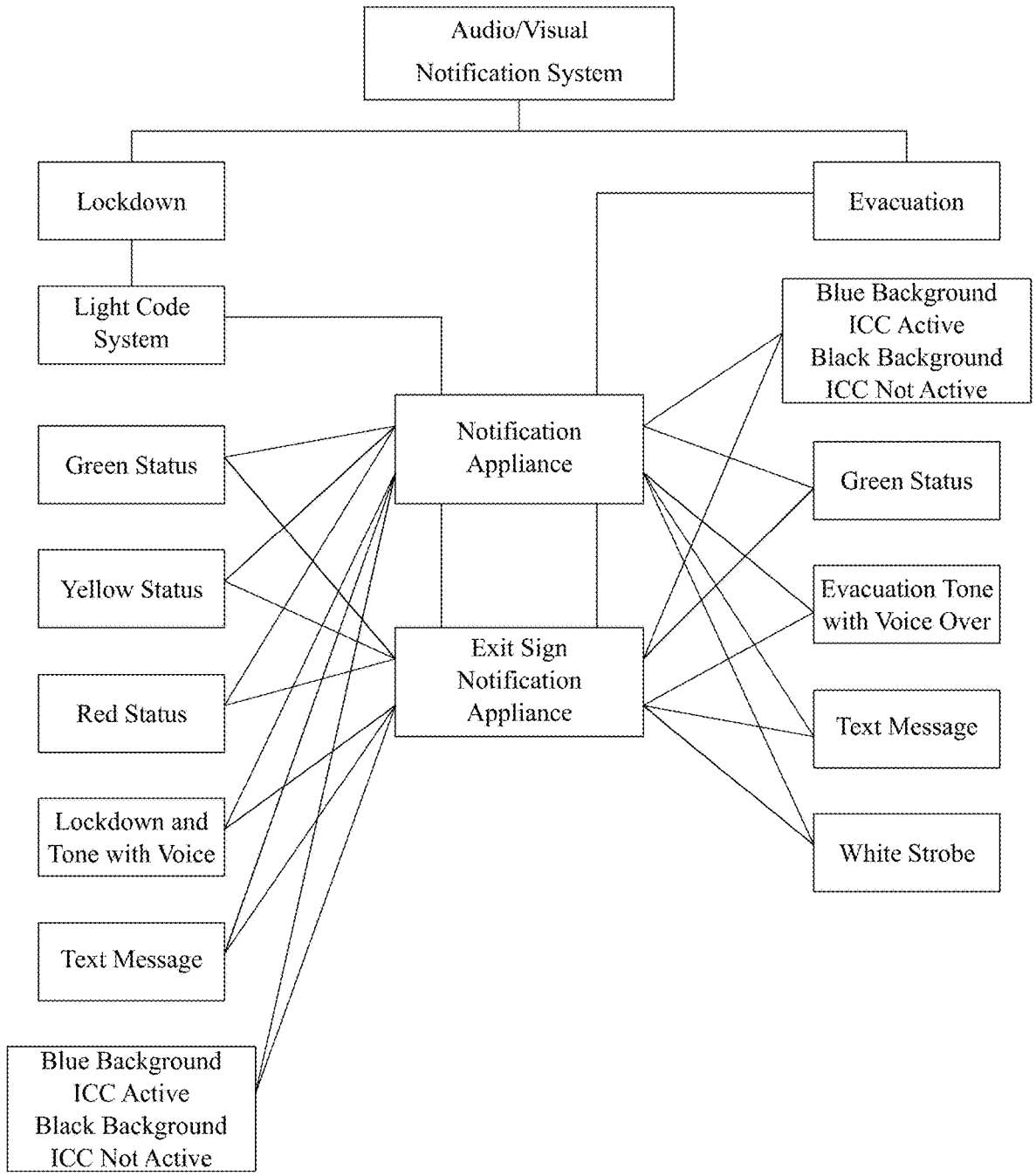
FIG. 9 is a diagram of the present invention illustrating the light code system of the UTAMSFOS.
Figure 10:
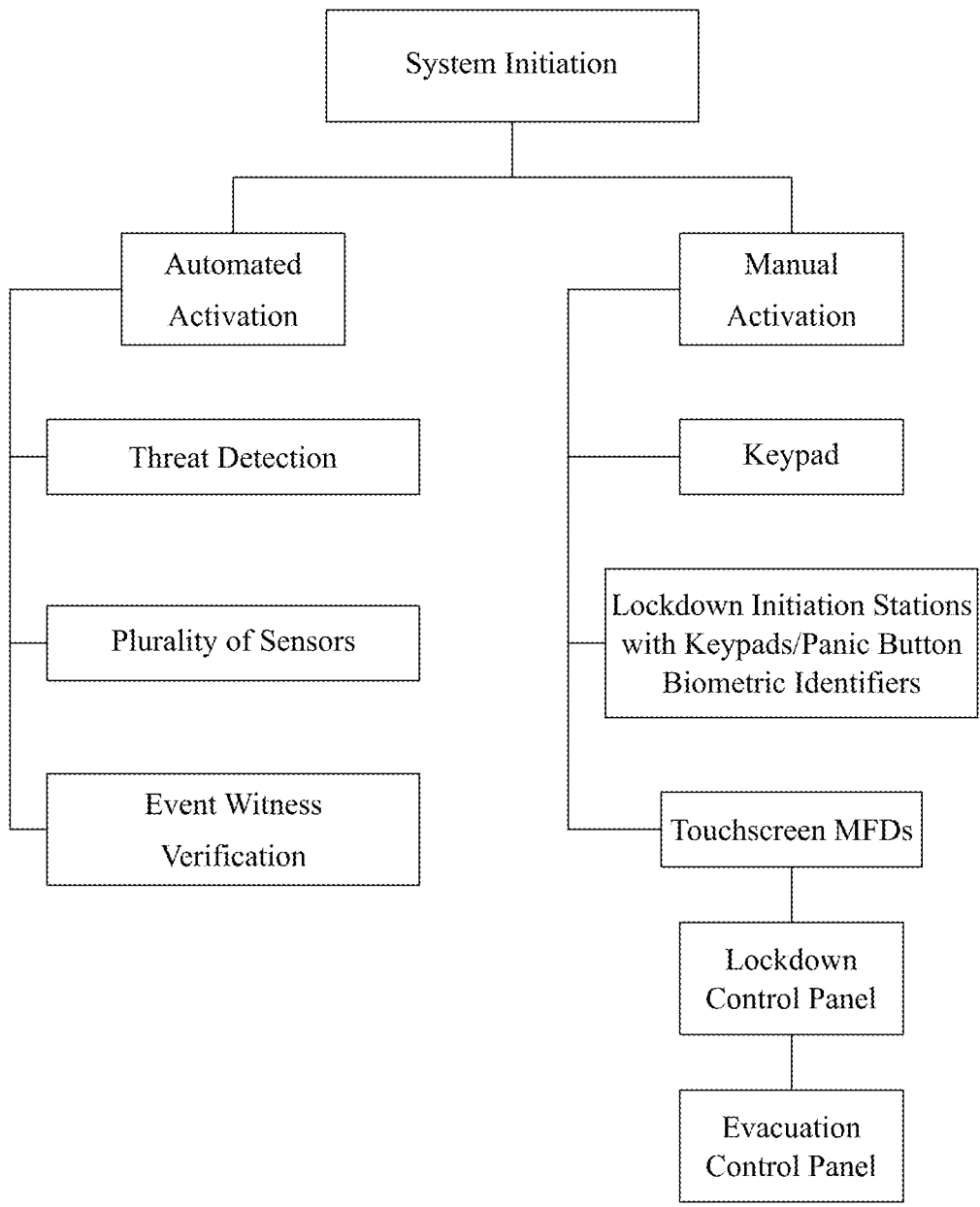
FIG. 10 is a diagram of the present invention illustrating the methods of system activation of the UTAMSFOS.
Figure 11:
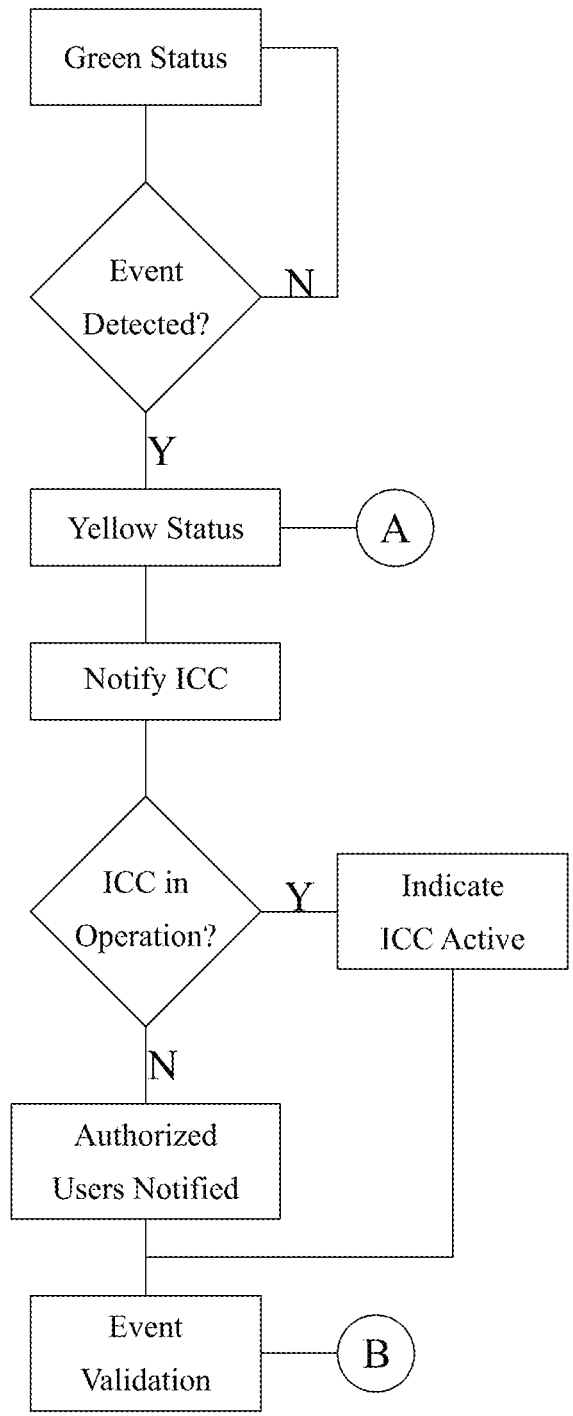
FIG. 11 is a diagram of the present invention illustrating the method of status change from green status to yellow status of the UTAMSFOS.
Figure 12:
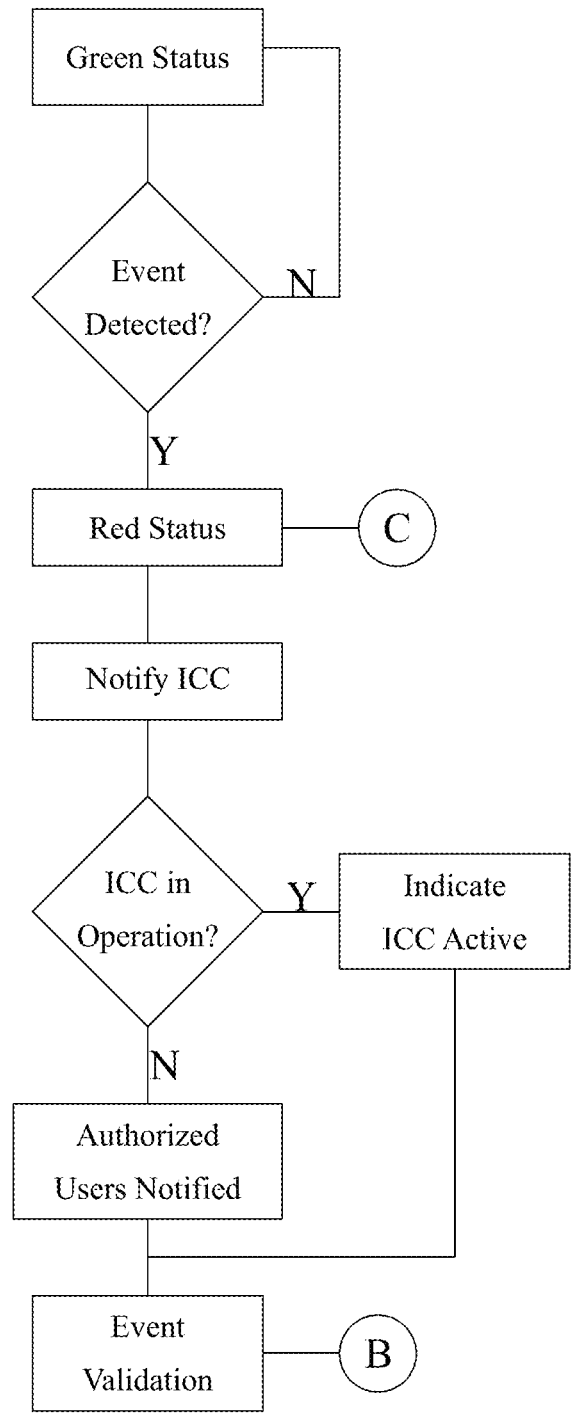
FIG. 12 is a diagram of the present invention illustrating the method of status change from green status to red status of the UTAMSFOS.
Figure 13:
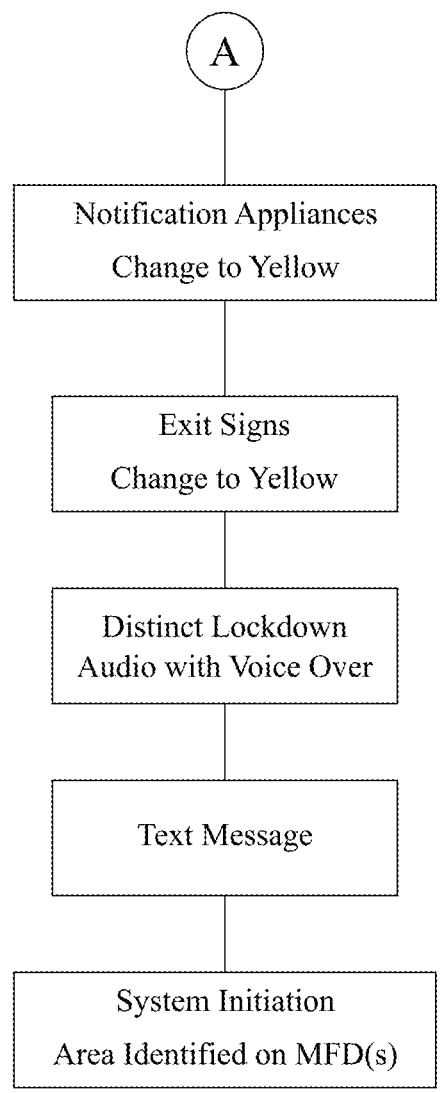
FIG. 13 is a diagram of the present invention illustrating the plurality of procedures of the yellow status of the UTAMSFOS.
Figure 14:
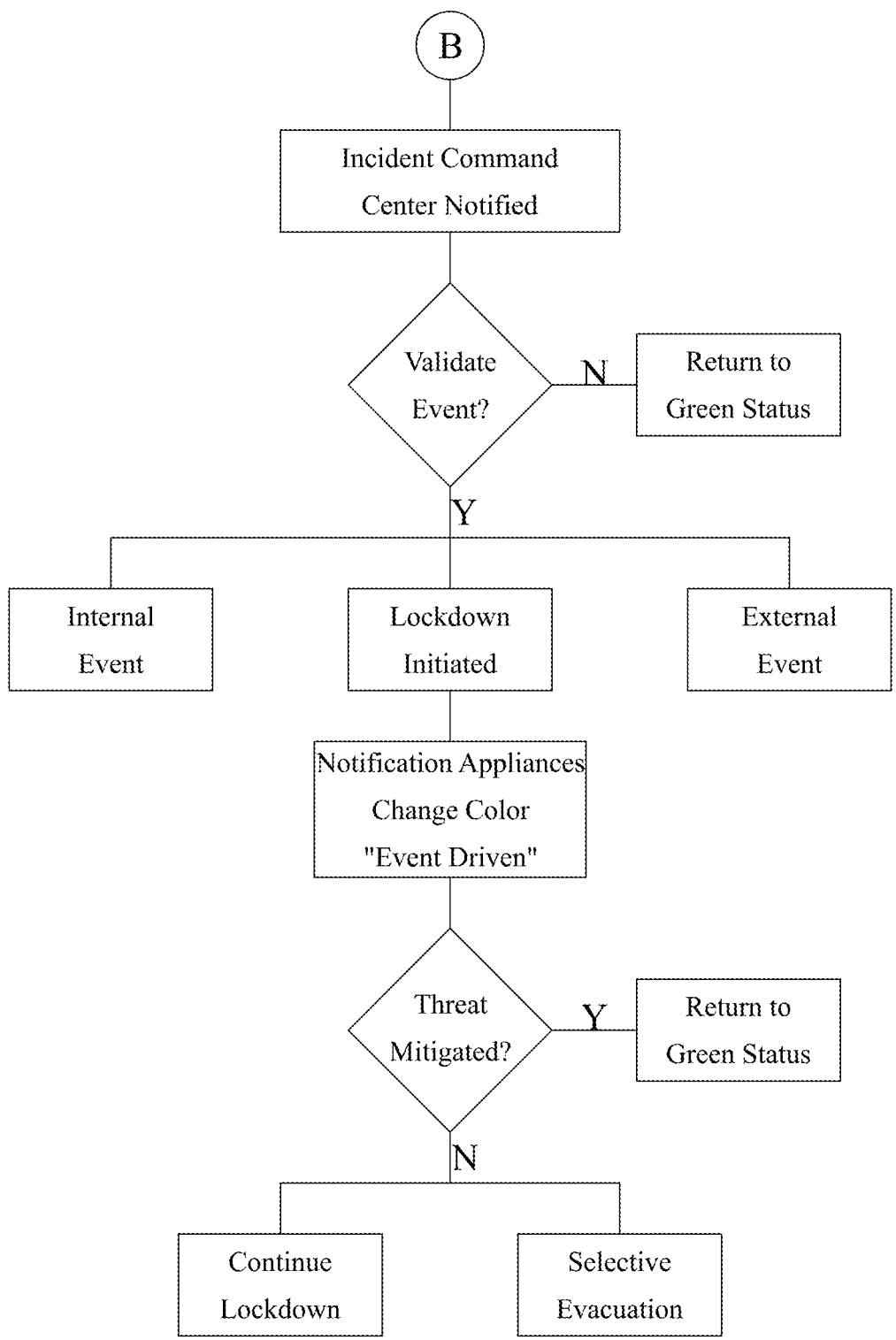
FIG. 14 is a diagram of the present invention illustrating the event validation processes of the UTAMSFOS.
Figure 15:
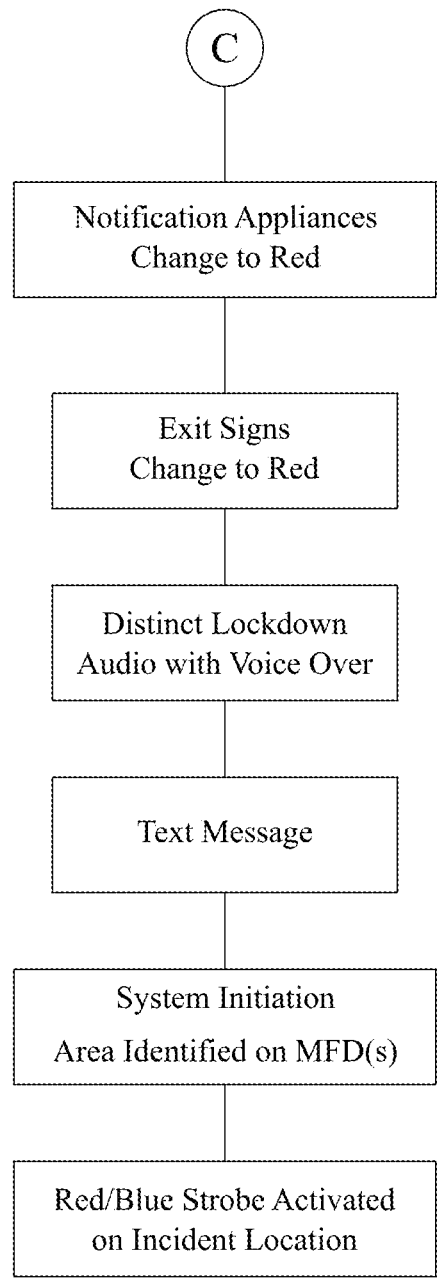
FIG. 15 is a diagram of the present invention illustrating the plurality of procedures of the red status of the UTAMSFOS.
Figure 16:
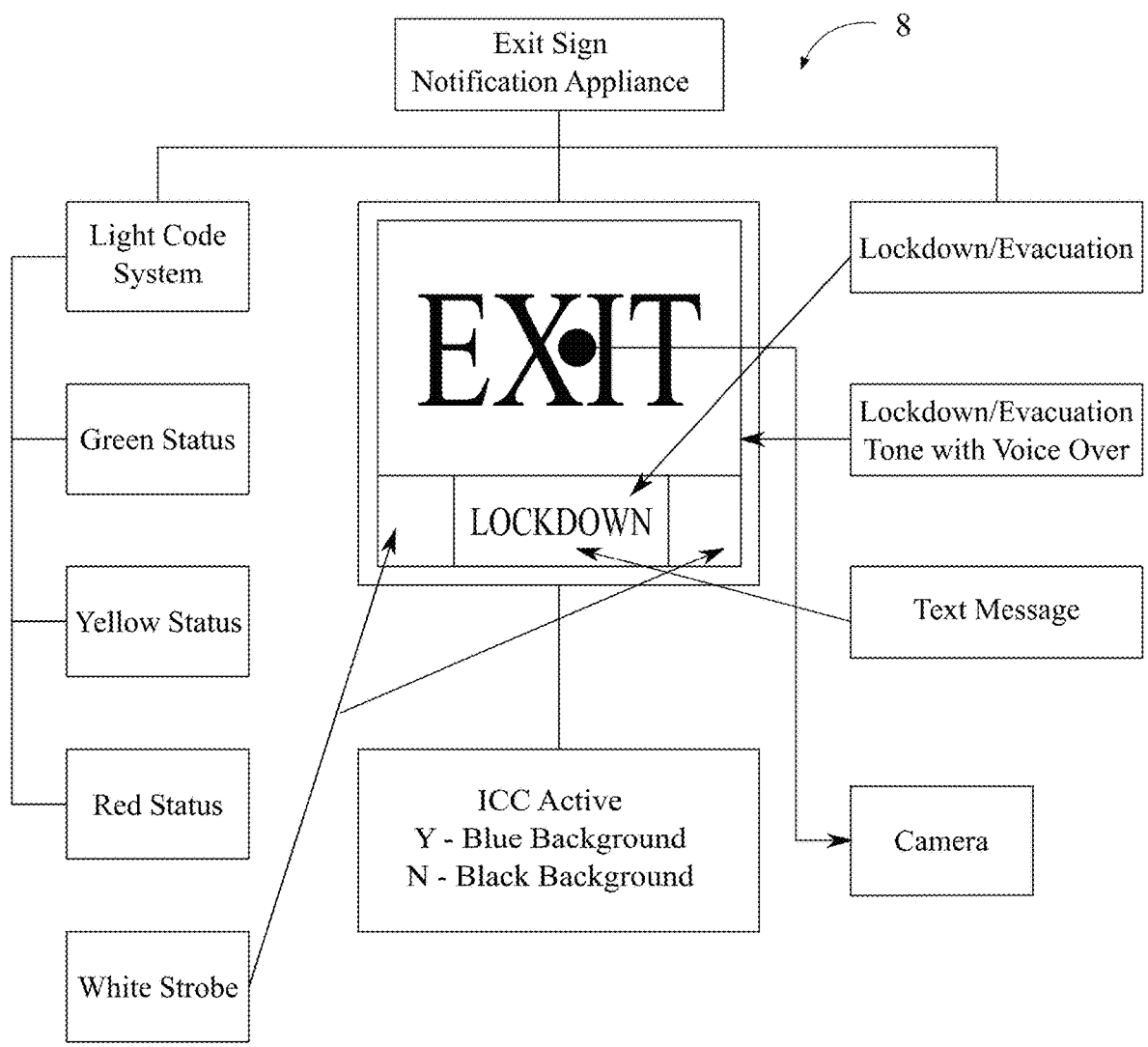
FIG. 16 is a drawing of the present invention illustrating the (UTAMSFOS) EXIT Sign, Notification Appliance.
Figure 17:
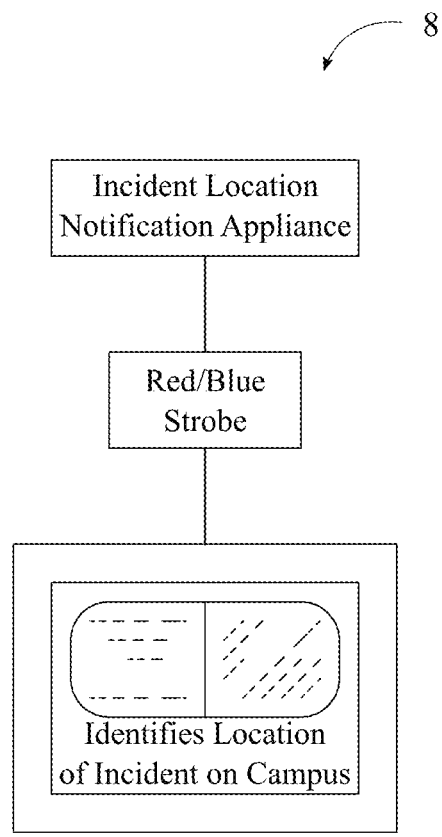
FIG. 17 is a drawing of the present invention illustrating the (UTAMSFOS) Incident Location, Notification Appliance.
Figure 18:
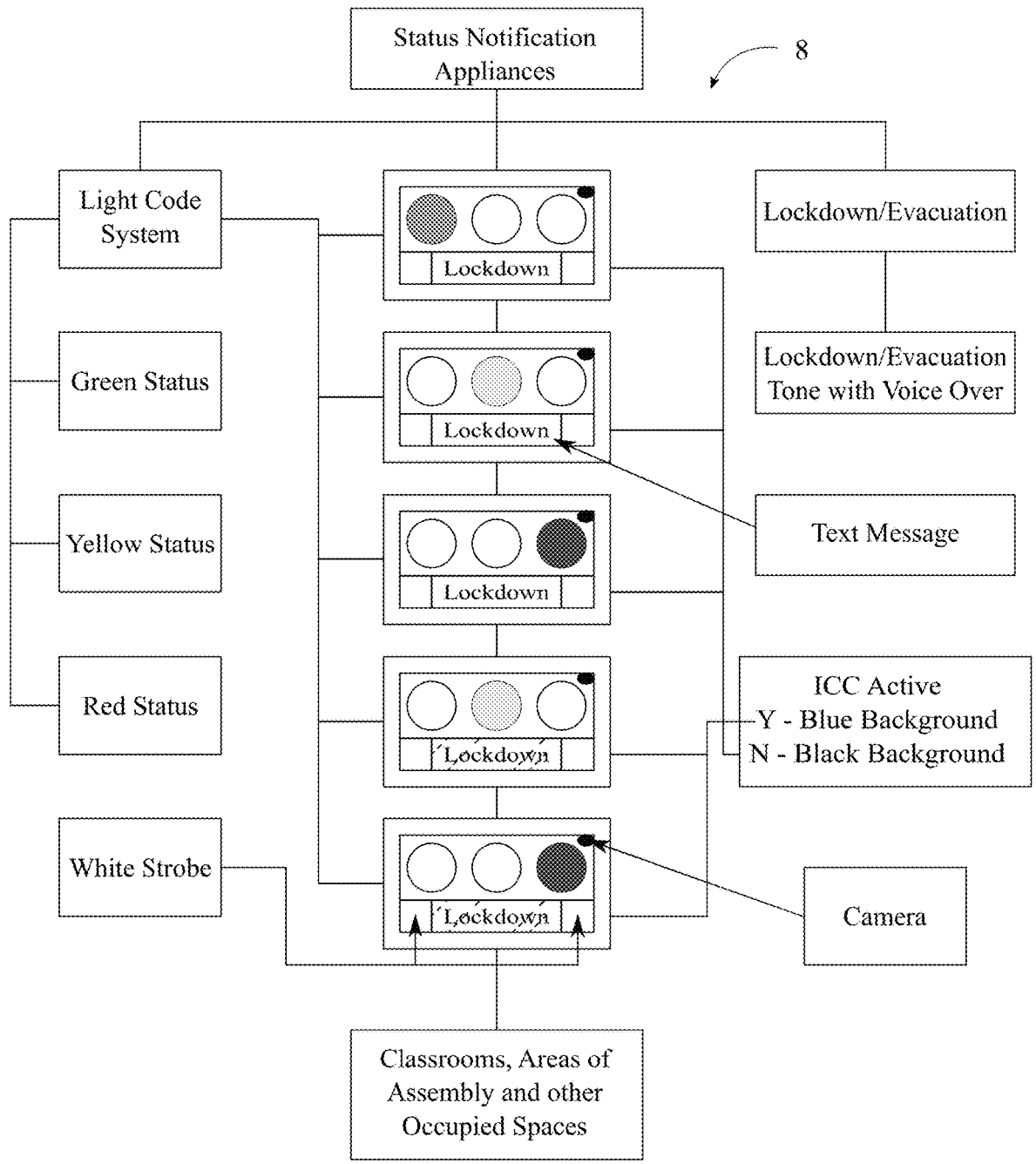
FIG. 18 is a drawing of the present invention illustrating the (UTAMSFOS) Status Notification Appliance.
Figure 19:
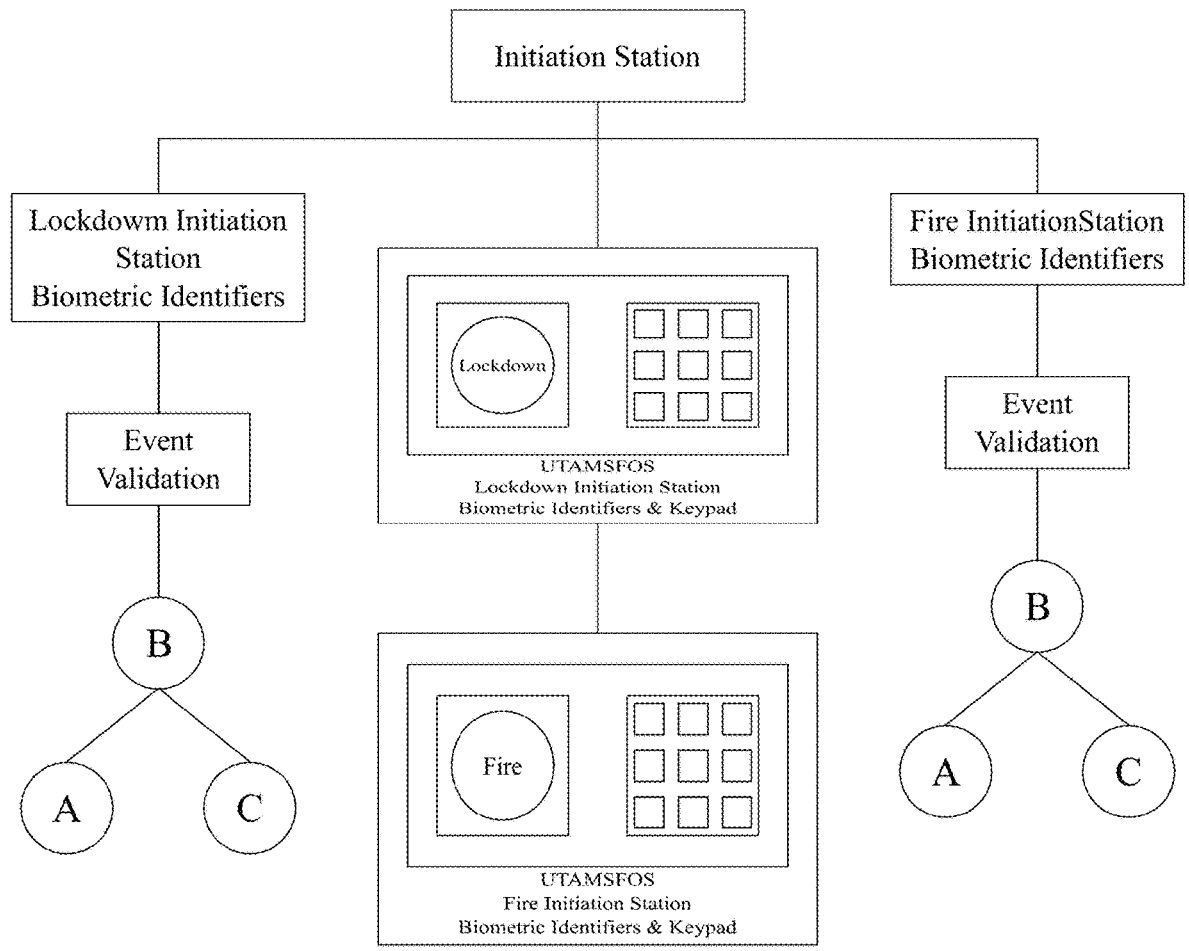
FIG. 19 is a drawing of the present invention illustrating the (UTAMSFOS) Lockdown/Fire Initiation Biometric Identifiers Stations.
Figure 20:
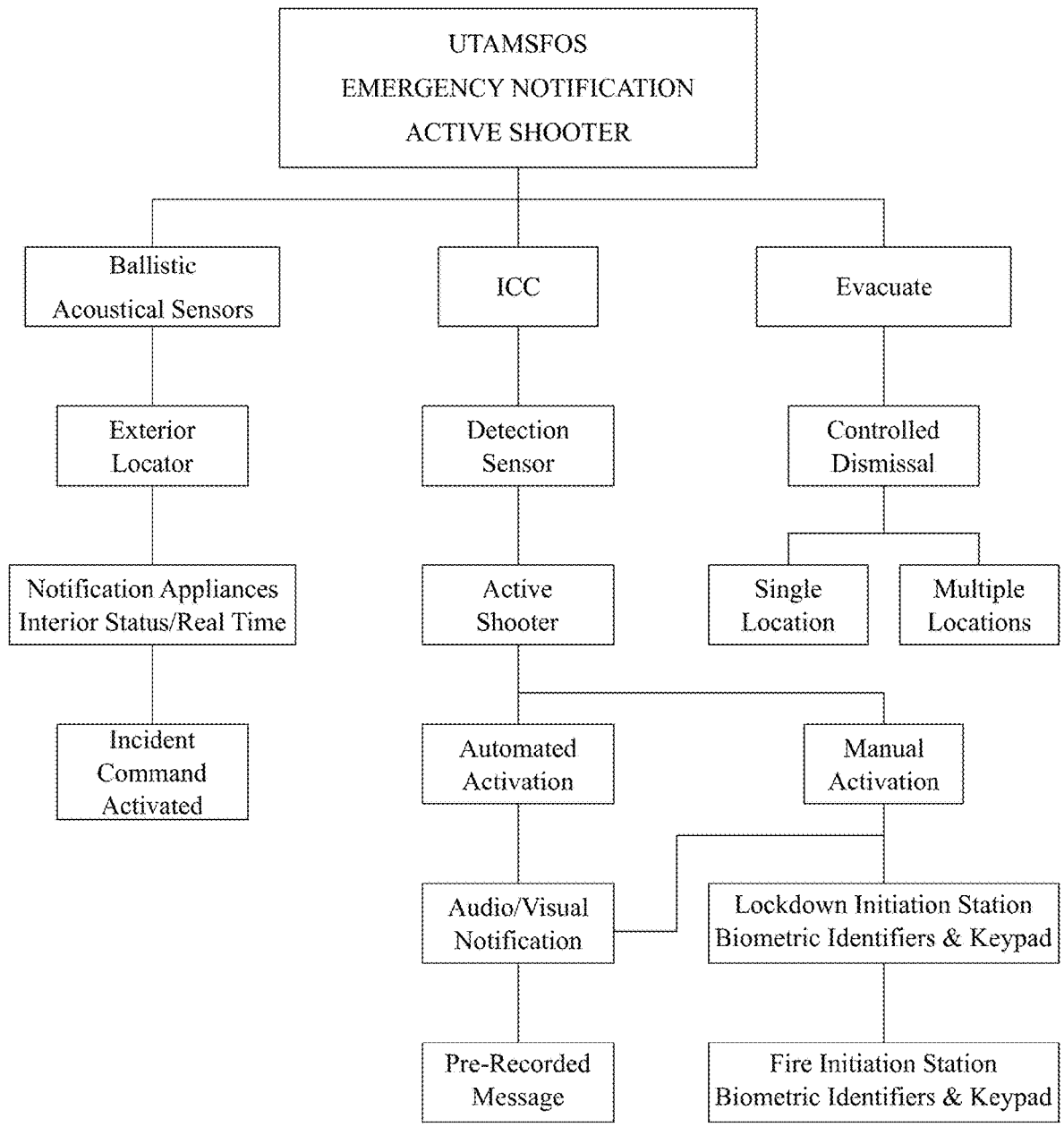
FIG. 20 is a drawing of the present invention illustrating the (UTAMSFOS) Emergency Notification Active Shooter.

In reference to FIG. 1 through FIG. 20, the present invention is a structure-wide real-time continuous threat awareness and management system that supports designated personnel in the monitoring of building status before, during and after a critical incident through use of a dedicated distributed network of threat management devices. The term "threat management device" is used herein to refer to devices designed to perform tasks including, but not limited to, monitoring environmental conditions, outputting audio-visual information, locking and unlocking doors, and contacting external emergency response personnel. Further, the present invention is designed to work within both a stationary secured location and one that is constructed ad-hoc. The threat management devices are designed to be distributed throughout a structure 9, or compound and used to function as an emergency alert and response system for the structure 9. For example, the present invention can be used to monitor a college campus that has multiple buildings. In this example, a first plurality of threat management devices will be distributed throughout the interior of each of the building. Additionally, a second plurality of threat management devices will be distributed around the exterior of the buildings. An incident commander or authorized user is able to monitor the entire campus by using the threat management devices. Further, the incident commander or authorized user is able to relay real time/current building status information to students, faculty, and emergency response personnel through the use of the threat management devices. Upon threat detection confirmation, the safety team or incident commander or authorized user is activated to enable the response team to utilize the Threat Management System to manage and mitigate the critical incident.

To achieve the above-described functionalities, the present invention comprises at least one primary interface device 1, at least one secured location 2, at least one audio output device 3, at least one visual output device 4, and at least one environmental sensor 5. The primary interface device 1 is a computing device used to provide control and relay information between the incident commander or authorized user and the present invention. Accordingly, the primary interface device 1 is designed to emulate various computing devices, including, but not limited to, smartphones, multifunction displays, touch screen multifunction displays, and proprietary system interface panels. Preferably, the secured location 2 is a room designed to prevent access from unauthorized individuals thereto. Preferably, the primary interface device 1 is mounted within the secured location 2 so that unauthorized individuals are prevented from accessing the primary interface device 1. As such, the primary interface device 1 cannot be tampered with to cause confusion or harm. Preferably, the primary interface device 1 is fixed to a command console within the secured location 2. Alternative embodiments are designed with, the primary interface device 1 as a mobile device. In these embodiments, the incident commander or authorized user is able to remotely monitor and control the entire structure 9 into which the present invention is integrated.

The audio output device 3 is designed to make use of systems that include speakers, public announcement systems, airhorns, and sirens. The visual output device 4 is designed to make use of systems including, but not limited to, backlit displays, multifunction displays, touch screen multifunction displays, LCDs, strobe lights, floodlights, and stationary images. Preferably, the at least one environmental sensor 5 is a plurality of environmental sensors 5 that is distributed throughout the structure 9 and is used to monitor the environment within and around the structure 9 for dangerous occurrences. For example, the environmental sensor 5 can be used to identify a toxic level of carbon monoxide in the structure 9. Embodiments of the present invention are designed with various types of environmental sensors 5 including, but not limited to, gunshot sensors, smoke detectors, and toxic and biological contamination detectors. The environmental sensor 5 then notifies the primary interface device 1 of the threat and the incident commander or authorized user is prompted to sound an alarm for lockdown or evacuate the structure 9, due to an Environmental concern. Preferably, the present invention is designed with a plurality of visual output devices 4, a plurality of audio output devices 3, and a plurality of environmental sensors 5 that are distributed within and around the structure 9. The audio output device 3, the visual output device 4, and the environmental sensor 5 are communicably coupled to the primary interface device 1. Additionally, the audio output device 3, the visual output device 4, and the environmental sensor 5 are mounted external to the secured location 2. As a result, the audio output device 3, the visual output device 4, and the environmental sensor 5 enable the incident commander or authorized user to monitor the structure 9 and quickly relay both audio and visual information to the people within and around the structure 9. In some embodiments, the environmental sensor 5 is an initiation device used to initiate an emergency alert condition.

Preferably the primary interface device 1 is designed to provide the incident commander or authorized user with a detailed interactive model of the structure 9 being monitored and provide real-time updates. To achieve this functionality, the primary interface device 1 further comprises a touch-screen multifunction display (MFD) 11 and a human input device (HID) 12. The MFD 11 and the HID 12 are mounted within the secured location 2 so that the devices are shielded from unauthorized access. Further the HID 12 is communicably coupled to the MFD 11. Accordingly, the HID 12 enables the incident commander or authorized user to quickly input commands and adjust system parameters.

Preferably, the Present invention is a robust system designed to promote progressive security measures while integrating with preexisting systems. To that end, the present invention further comprises at least one primary authentication device 13 and at least one legacy system interface 14. The primary authentication device 13 is a security system that analyses some form of primary identification to determine if an individual is an authorized user. For example, the primary authentication device 13 can be any authentication device including, but not limited to, fingerprint scanners and other biometric sensors, card readers, RFID devices, and keypads. The legacy system interface 14 is a device designed to enable interoperability between the present invention and legacy systems. For example, the legacy system interface 14 is a remote annunciator that enables the incident commander or authorized user to quickly monitor the building fire alarm system and actively manage any fire events being detected throughout the facility in real time. The primary authentication device 13 and the legacy system interface 14 are communicably couple to the primary interface device 1 so that the incident commander or authorized user can govern the functions of the two components by interacting with the primary interface device 1. Preferably, the primary authentication device 13 and the legacy system interface 14 are mounted within the secured location 2 so that unauthorized individuals cannot access the primary authentication device 13 and the legacy system interface 14. Alternatively, the primary authentication device 13 and the legacy system interface 14 are mounted external to the secured location 2 so that authorized individuals can access the primary authentication device 13 and the legacy system interface 14 from various locations within the structure 9. In some embodiments the MFD 11, the HID 12, the primary authentication device 13, and the legacy system interface 14 are all integrated into the primary interface device 1 to form a mobile console capable of forming an ad-hoc secured location 2.

The present invention is designed to enable multiple authorized individuals to become part of an emergency response team. To that end, in some embodiments, the present invention further comprises at least one secondary interface device 6, at least one secondary authentication device, and at least one remote server 7. The secondary device is a computing device similar to the primary interface device 1 and is designed to relay information between an authorized user and the present invention. For example, the secondary authentication device can be any authentication device including, but not limited to, fingerprint scanners and other biometric sensors, card readers, RFID devices, and keypads. As such, the secondary interface device 6 is communicably coupled to the primary interface device 1 and is positioned external to the secured location 2. Accordingly, authorized user is able to communicate real-time information with the incident commander or authorized user through the secondary interface device 6 and the primary interface device 1 respectively. The secondary interface device 6 is designed to emulate various computing devices, including, but not limited to, smartphones, multifunction displays, and proprietary system interface panels. In some embodiments, a plurality of authorized users is equipped with a plurality of secondary interface devices 6. In this embodiment, the plurality of authorized users forms a mesh network where communication can flow freely between authorized users. In further embodiments the secondary interface device 6 is a mobile system. In separate embodiments the secondary interface device 6 is fixedly mounted to the structure 9.

The secondary authentication device is communicably coupled to the primary interface device 1 and is positioned external to the secured location 2. Consequently, an individual is able to identify themselves as an authorized user of the secondary interface device 6 by presenting the appropriate credentials to the secondary authentication device. This enables the authorized user to access many of the plurality of secondary interface devices 6 that are distributed throughout the structure 9. Thus, giving the authorized user options in case a preferred secondary interface device 6 is destroyed or unreachable. The secondary interface device 6 may serve as a lockdown initiation station that initiates a lockdown condition without the use of the primary interface device 1. The authorized user is able to initiate a lockdown condition when a credible threat is detected. This lockdown condition will cause the plurality of emergency response devices to perform a response protocol that is appropriate for the lockdown condition initiated. When a lockdown condition is initiated, the primary interface device 1 will notify the authorized users of the critical incident. The incident commander or authorized user will then be required to either maintain or rescind the lockdown condition initiated by the authorized user. Thus, the system operates on multiple layers of redundancy.

The remote server 7 is designed to run background processes that facilitate communication and threat management operations. The remote server 7 is positioned external to the secured room and the secondary interface device 6 and the primary interface device 1 are communicably coupled to the remote server 7. Accordingly, the primary interface device 1 and the secondary interface device 6 are able to communicate with third party systems through the remote server 7. For example, the incident commander or authorized user is able to communicate with law enforcement, fire, and emergency response personnel by interacting with the primary interface device 1. The remote server 7 then relays data between the primary interface device 1 and law enforcement, fire, and emergency response personnel. The primary interface device 1 and the secondary interface device 6 are designed to communicate through both wired and wireless connections.

As described above, the at least one visual output device 4 is preferably a plurality of visual output devices 4 that comprises at least one external display device 42 and at least one internal display device 41. The external display device 42 is mounted external to the structure 9. Accordingly, the external display device 42 is able to notify people and LEA-$1^{st}$ responders positioned outside of the structure 9, the location of the critical incident. The internal display device 41 is mounted within the structure 9. Consequently, the internal display device 41 is able to notify people positioned within the structure 9 that there is an active lockdown condition. Alternatively, the internal display device 41 is used to provide detailed information about the status of the lockdown inside the structure 9.

As described above, the at least one audio output device 3 is preferably a plurality of audio output devices 3 that comprises at least one external audio device 32 and at least one internal audio device 31. The external audio device 32 is mounted external to the structure 9. Accordingly, the external audio device 32 is able to notify people positioned outside of the structure 9 that there is an active lockdown condition. Alternatively, the external audio device 32 is used to provide an audible alert to building occupants. The internal audio device 31 is mounted within the structure 9 to provide a similar caliber of auditory information. Consequently, the internal audio device 31 is able to notify people positioned within the structure 9 that there is an active lockdown condition.

The present invention is designed to provide detailed information about the threat to individuals within the structure 9. To that end, the present invention further comprises at least one notification appliance 8. The notification appliance 8 is a system used to simultaneously relay a specific message to a group of individuals. To achieve this functionality, the notification device is mounted within the structure 9, external to the secured location 2, and comprises a sign body, a visual information system and an audio information system 83. The appliance body 81 is the structural housing of the notification appliance 8 and is constructed to facilitate relaying visual and audible information. The visual information system is a display device that enables the present invention to relay color-coded information to the individuals within the structure 9. The audio information system 83 is a speaker device that enables the present invention to relay audio information to the individuals within the structure 9. Additionally, the visual information system is laterally integrated into the appliance body 81. Further, the audio information system 83 is mounted in or adjacent to the appliance body 81. As a result, the notification appliance 8 forms a self-contained unit that can be advantageously mounted to relay information to individuals within the structure 9. The notification appliance 8 is communicably coupled to the primary interface device 1 so that the incident commander or authorized user is able to direct the notification appliance 8 to output desired pieces of information.

In some embodiments the visual information system comprises at least one display screen 821, at least one color-coded notification light 822, and at least one system status light 823 and functions as a color-coded alert system. The color-coded notification lights 822 and the system status light 823 are positioned offset from the display screen 821 across the appliance body 81. Accordingly, the display screen 821, the color-coded notification lights 822 and the system status light 823 are positioned to facilitate gathering information through visual communication. For example, red lights would correspond to high threat level within or adjacent to the campus, yellow lights to indicate a medium threat level within or adjacent to the campus, and green lights to indicate all clear no threats present. The system status light 823 would change color to indicate various other pieces of information. Preferably, the system status light 823 turns blue to indicate the presence of the incident commander or authorized user. Further, a text display can be integrated into the system status light 823 to provide additional updates. Preferably, the display screen 821 is an exit light with color changing text. When the text is green, the user knows the threat status is "All Clear". Likewise, when the text is yellow, the user knows the threat status is "LOCK DOWN limited movement in Structure". "Caution Possibility of an Internal or External Threat". Similarly, when the text is red, the user knows the threat status is "LOCK DOWN no Movement in Structure". Preferably, the at least one color-coded notification light 822, is a set of three color-coded notification lights 822, that are distributed along the surface of the appliance body 81. Additionally, set of color-coded notification lights 822, is intended to follow the same threat-level color scheme as the text of the exit sign.

Supplemental embodiments of the notification appliance 8 further comprise at least one strobe light 824 and at least one camera 825. The strobe light 824 and the camera 825 are mounted adjacent to the appliance body 81. Accordingly, the notification appliance 8 is able to capture visual information about the surrounding area. Thus, giving the incident commander or authorized user access to more detailed information about the threatening event. Further embodiments of the present invention comprise at least one locking mechanism 91. The locking mechanism 91 is used to remotely lock and unlock a door. Additionally, the locking mechanism 91 is mounted external to the secured location 2 and communicably coupled to the primary interface device 1. Further, the at least one door locking mechanism 91 is preferably a plurality of door locking mechanisms that are integrated into the doors of the structure 9. As a result, the incident commander or authorized user is able to lock the doors at specific points of entry.

Supplemental Descriptions of the Invention

In reference to FIG. 1 through FIG. 20, the present invention provides a Universal Threat Awareness Management System for Occupant Safety (UTAMSFOS). In the preferred embodiment of the present invention, the system of the present invention comprises a plurality of protocols and procedures corresponding to one or more emergencies. This system can be configured as a stand-alone threat management system that can include a Fire Alarm System. The preferred embodiment of the present invention comprises an IC controlled lockdown and evacuation alert system. System protocols and procedures are predetermined based on which threat is most imminent and detrimental. Information required to place the facility and system in lockdown configuration must be reliable and streaming in real time. In the preferred embodiment of the present invention, system activation must be verified by one or more authorized users for lockdown protocols and procedures to continue. The lockdown system configuration automatically IN-OP the fire alarm notification appliance circuits, bell schedule and other third-party audible notifications that would cause a conflict with the lockdown. All other functions of the fire alarm system continue operating normally. During an emergency, once an authorized user has assumed the incident commander position, the incident commander shall activate all lockdown notification devices to alert building occupants the command center has become operational. The incident commander can see all fire alarm initiating device events occurring in real time at the FACP or any similar remote fire alarm annunciator panel. Thus, unauthorized users are unable to activate the fire alarm system in order to compromise the facility lockdown. The system also maintains the incident commander updated of all fire events being generated from manual and/or automatic fire alarm initiating devices in real time throughout the facility. In the preferred embodiment of the present invention, the activation of a plurality of fire alarm initiating devices cause the fire alarm NAC circuits to resume normal operation unless the incident commander intervenes from the control center. In the absence of an incident commander or authorized user in the command center or other redundant control locations, the fire event would be the controlling event and fire alarm notification protocols will be initiated.

The system of the present invention provides one or more high-resolution touch screen Multi-Function Displays (MFDs) which depict the campus site with all the buildings and unique features of the campus site. In the preferred embodiment of the present invention, the MFDs provide easy-to-understand, clear and precise visual references of all variables related to the emergency. The references provided by the MFDs can include, but are not limited to, plain text references, graphics, pictures, videos, etc. Further, the MFDs are connected to a plurality of sources to receive live reports or other live information. The MFD allows occupants of the facility to begin implementing pre-established safety/response procedures at the earliest possible time; thereby, giving the occupants the best possible chance of survival until law enforcement personnel arrive. Building administration can communicate to arriving law enforcement personnel the exact location on the campus where the event was first identified by reading the plain text on the MFD as well as live reports from witnesses in the active area. The location on the campus site where the lockdown was initiated will also be identified by a flashing blue/red beacon lights located on the exterior of all buildings. If necessary, the incident commander or authorized user can update the incident location—from the MFD to the new location by turning off the previous location and turning on the new location. With live reports streaming to the incident commander or authorized user, first responders can ID the active area by locating the blue/red beacon lights located on the exterior of the buildings. Authorized users can also provide first responders the same information by viewing the lockdown system MFD and reading the plain text off any strategically located remote annunciators should the primary incident command center be compromised. The system of the present invention is further capable of receiving and interpreting data from other types of threat sensors including, but not limited to, Carbon Monoxide sensors, chemical sensors, flame sensors, radiation sensors, biological sensors, high-energy microwaves sensors, etc. The type and location of the threat being sensed will be displayed on the MFD located in the command center. Thus, the incident commander or authorized user has access to real-time situational threat awareness.

In the preferred embodiment of the present invention, the MFD has the capability of depicting two separate site maps. One for lockdown and one for evacuation. Each of the site maps are capable of expanding to full screen or minimizing. In another embodiment, there can be two separate MFD(s), one for lockdown, and one for evacuation. The lockdown MFD setting shows users the site map illustrating the entire campus with all buildings and structures which show more detail when users zoom in on any zone. The lockdown MFD setting further gives instant visual indication of the area where the lockdown system initiation happened. The lockdown MFD setting provides the incident commander or authorized user control over the red/blue strobe lights indicating the incident location to activate/deactivate and/or update the condition of the incident as more information is available. In the Evacuation Control MFD setting, users are given instant visual indication on a campus wide site map of any active fire events occurring in real-time. The Evacuation Control MFD setting gives the Incident commander or authorized user control over the lockdown and evacuation system notification devices. Depending on the situation, the incident commander or authorized user can selectively evacuate any building, floor or zone based on real-time verified information coming from a plurality of sources.

In the preferred embodiment of the present invention, the system of the present invention is predicated on an incident commander or authorized user receiving real-time information from a plurality of sources. The plurality of sensors can include, but are not limited to, sensors from the lock down system, fire alarm, live eyewitness reports, etc. The system of the present invention can be activated automatically and will instantly begin predetermined lockdown protocols. However, for the lockdown to continue, an authorized user will have to input a unique code within a predetermined time range for the lockdown to continue. In addition, a surveillance system can be provided near the Manual Activation Keypads to transmit a live video feed of the area surrounding the Manual Activation Keypads to all authorized users in the event of system activation. Thus, the one or more users who activated the system will be identified to help validate the event. The system can also be activated by authorized users from various strategically placed stations located throughout the campus. In the preferred embodiment of the present invention, the strategically placed Biometric Identifiers can provide a means of activating the system when an authorized user is not available. If fingerprints are detected, the Fingerprint Recording Push Button initiating device will activate the UTAMSFOS placing the building in Lockdown. If no fingerprints are recognized, administration will be alerted, and lockdown will not occur until event is verified. The existing fire alarm system can also be initiated at a Fire Initiation Station Biometric Identifier, or by manual activation utilizing the keypad. It will provide instant notification to the ICC of the manual fire station activation. However, a fire alarm notification appliance delay may be incorporated to prevent the fire alarm being used to compromise a lockdown.

Building administration must validate the lockdown within a specified time period for lockdown to continue, thus allowing anyone to initiate a lockdown due to a perceived threat. Validation can occur by means of the following: a) verbal communication with an authorized user, b) validation code entered by authorized user, c) communication with the person initiating the lockdown, d) live video feed, e) visual verification by students, staff or visitors. If the building administration does not communicate after a predetermined period, one or more notifications with the location of the lockdown initiation will be sent to all other authorized users within the facility. In the preferred embodiment of the present invention, there must be an authorized user to extend or stop the system lockdown. In an automated embodiment of the present invention, a plurality of sensors designed to identify gunshot signatures will automatically place the system in lockdown when a threat is detected. All protocols and procedures for lockdown will be initiated when a threat is detected. All lockdowns initiated by automatic devices must be validated by an authorized user within a specific time period for the lockdown to continue; if not validated within the specified period, the lockdown will return to normal status. An authorized or designated user must confirm the validity of the event and assume command. Otherwise, the system will return to normal conditions after the timer has expired. Thus, redundancy is introduced in the system to minimize or eliminate unwarranted lockdowns in situations where the building administration area is compromised.

Lockdown notifications occur both audibly and visibly. The system of the present invention utilizes specially designed illuminated lockdown notification appliances which can be distributed around the campus site. Lockdown notifications of the present invention can further utilize fire alarm strobe lights with audible notifications. In the preferred embodiment of the present invention, the visible notifications of the system utilizes built-in cameras and the universally known red, yellow, and green light system. The green light preferably corresponds to normal all clear conditions of the system. The yellow light preferably corresponds to a condition where there is a threat in the vicinity of the premise but not on the campus site. The yellow light condition allows some movement based on predetermined protocols and is less restrictive than red light conditions. However, under yellow light condition the facility is on lockdown. The red light preferably corresponds to a condition where there is an imminent threat within the facility. Under the red light condition the system implements the most stringent predetermined lockdown procedures. In the preferred embodiment of the present invention, a unique audible notification with an intermittent lockdown voiceover occurs during the yellow light and/or red light conditions. In addition, each visible notification device comprises a blue light and/or comprises a background which turns blue detected. The blue light or illuminated blue background preferably notifies occupants that the command center is operational. Furthermore, the system of the present invention comprises a novel EXIT sign structure comprising notification capabilities, notification for lockdown in one configuration and evacuation in another configuration. The combination of EXIT signs and lockdown/evacuation notification appliances provide coverage throughout the campus site.

In the preferred embodiment of the present invention, the EXIT signs have built-in cameras and utilize the same light code system as the lockdown notification appliances of the present invention. The EXIT signs of the present invention change colors and provide audible notifications with lockdown voiceovers depending on the state of the facility. In the preferred embodiment of the present invention, the EXIT signs of the present invention utilize the universally known red, yellow, and green light system along with corresponding audible notifications. The green light preferably corresponds to normal all clear conditions of the system. The yellow light preferably corresponds to a condition where there is a threat in the vicinity of the premise but not on the campus site. The yellow light condition allows some movement based on predetermined protocols and is less restrictive than red light conditions. However, under yellow light condition the facility is on lockdown. The red light preferably corresponds to a condition where there is an imminent threat within the facility. Under the red light condition the system implements the most stringent predetermined lockdown procedures. In the preferred embodiment of the present invention, a unique audible notification with an intermittent lockdown voiceover occurs during the yellow light and/or red light conditions. In addition, each visible notification device comprises a blue light and/or comprises a background which turns blue. The blue light or illuminated blue background preferably notifies occupants that the command center is operational. In some embodiments of the present invention, fire alarm strobe lights consistent with existing fire alarms including evacuate voiceovers can be included in the system of the present invention. The strobe lights can be utilized as redundant backups to give the incident commander or authorized user the ability to easily evacuate specific buildings, zones, or floors in response to the evolving emergency without involved the building fire alarm system.

Although the invention has been explained in relation to its preferred embodiment, it is to be understood that many other possible modifications and variations can be made without departing from the spirit and scope of the invention as hereinafter claimed.

What is claimed is:

1. A Universal Threat Awareness Management System for Occupant Safety consisting of:
    at least one primary interface device having an alpha numeric display;
    at least one audio output device provided as an external audio device, an internal audio device, or a combination thereof, wherein said external audio device is located on an exterior of a structure, wherein said internal audio device is located within an interior of a structure;
    at least one visual output device provided as an external display device, and internal display device, or a combination thereof, wherein said external display device is located on the exterior of the structure, wherein said internal display device is located within the interior of the structure;
    the audio output device and the visual output device being communicably coupled to the primary interface device;
    said at least one primary interface device providing a detailed interactive model of a structure being monitored, said at least one primary interface device providing real-time updates of said structure;
    at least one notification appliance, said notification appliance being a status notification appliance or an exit sign, said notification appliance including an appliance body, a visual information system, and an audio information system, the appliance body being mounted to an interior or an exterior of the structure, the notification appliance being communicably coupled to the primary interface device, said visual information system further including at least one lighting member which displays at least one color, said color being associated with different types of events, conditions, or status, said visual information system further including at least one strobe light and at least one camera, said audio information system further including a speaker to emit audible notifications and a microphone, wherein the status notification appliance provides visual warnings related to a lockdown sequence to occupants located on the interior or the exterior of the structure; and
    a secondary device provided as an initiation station configured to permit users to actuate the system when a particular event is present, wherein said secondary device includes a biometric element that authenticates a user to permit said user to actuate said system, wherein said secondary device is a stationary device or a mobile device that is communicably coupled to the at least one primary interface device that allows a user to initiate a lockdown sequence.

2. A Universal Threat Awareness Management System for Occupant Safety comprising:
    at least one primary interface device;
    at least one audio output device provided as an external audio device, an internal audio device, or a combination thereof;
    at least one visual output device provided as an external display device, and internal display device, or a combination thereof;
    the audio output device and the visual output device being communicably coupled to the primary interface device;
    said at least one primary interface device providing a detailed interactive model of a structure being monitored, said at least one primary interface device providing real-time updates of said structure; and
    at least one notification appliance, said notification appliance being an exit sign or a status notification appliance, said notification appliance including an appliance body, a visual information system, and an audio information system, the appliance body being mounted to an interior or an exterior of the structure, the notification appliance being communicably coupled to the primary interface device, said visual information system further including at least one lighting member which displays at least one color, said color being associated with different types of events, conditions, or status, said visual information system further including at least one strobe light, wherein said audio information system further includes a speaker to emit audible notifications, wherein the status notification appliance provides audio and visual warnings related to a lockdown sequence to occupants located on the interior or the exterior of the structure.

3. The Universal Threat Awareness Management System for Occupant Safety as claimed in claim 2 comprising:
    the primary interface device comprising at least one multifunction display (MFD); and
    the MFD being touchscreen.

4. The Universal Threat Awareness Management System for Occupant Safety as claimed in claim 3 comprising:
    the primary interface device further comprising at least one human interface device (HID); and
    the HID being communicably coupled to the MFD.

5. The Universal Threat Awareness Management System for Occupant Safety as claimed in claim 2 comprising:
    at least one primary authentication device; and
    the primary authentication device being communicably coupled to the primary interface device, said primary authentication device being a keypad and/or at least one biometric sensor.

6. The Universal Threat Awareness Management System for Occupant Safety as claimed in claim 2 comprising:
    at least one legacy system interface; and the legacy system interface being communicably coupled to the primary interface device, said legacy system adapted to detect threats and allow for actively managing and monitoring said threats remotely or from a command center.

7. The Universal Threat Awareness Management System for Occupant Safety as claimed in claim 2 comprising:
at least one secondary interface device; and
the secondary interface device being communicably coupled to the primary interface device.

8. The Universal Threat Awareness Management System for Occupant Safety as claimed in claim 7 comprising:
at least one remote server;
the secondary interface device and the primary interface device being communicably coupled to the remote server; and
said secondary interface device being communicably coupled to said primary interface device and remote server, said secondary interface device providing full function real time redundant monitoring, initiation and control of the system from a permanently mounted or portable device.

9. The Universal Threat Awareness Management System for Occupant Safety as claimed in claim 2 comprising:
the visual information system comprising at least one display screen and at least one status light, said display screen extending across a length of said appliance body; and
the status light being positioned offset from the display screen across the appliance body, said status light being integrated within the notification appliance or entirely below said display screen.

10. The Universal Threat Awareness Management System for Occupant Safety as claimed in claim 9 comprising:
the visual information system comprising at least one color-coded notification light; and
the one color-coded notification light being mounted adjacent to the appliance body, said one color-coded notification light extending across a length of said appliance body, each of said one color-coded notification light being adjacent and parallel to each other, said one color-coded notification light being entirely above of said status light, each of said one color-coded notification light emitting a different color.

11. The Universal Threat Awareness Management System for Occupant Safety as claimed in claim 2 comprising:
the notification appliance further comprising at least one strobe light; and
the strobe light being mounted adjacent to the appliance body, said strobe light being adjacent and parallel to said status light, said strobe light being at lateral sides of said status light.

12. The Universal Threat Awareness Management System for Occupant Safety as claimed in claim 2 comprising:
the notification appliance further comprising at least one camera; and
the camera being mounted adjacent to or within the appliance body, said camera being entirely above of said display screen, said camera being centrally located on said at least one notification appliance.

13. The Universal Threat Awareness Management System for Occupant Safety as claimed in claim 2 comprising:
at least one door locking mechanism; and
the door locking mechanism being communicably coupled to the primary interface device.

14. The Universal Threat Awareness Management System for Occupant Safety as claimed in claim 2 comprising:
the at least one environmental sensor being a plurality of environmental sensors; and
the plurality of environmental sensors being distributed across the structure.

15. The Universal Threat Awareness Management System for Occupant Safety as claimed in claim 2 comprising:
at least one environmental sensor, said at least one environmental sensor notifying said primary interface device to sound an alarm when necessary, said at least one environmental sensor being communicably coupled to the primary interface device.

16. The Universal Threat Awareness Management System for Occupant Safety as claimed in claim 2 wherein the notification appliance further includes an alpha-numeric display.

17. The Universal Threat Awareness Management System for Occupant Safety as claimed in claim 2 wherein the audio information system further includes a microphone.

18. The Universal Threat Awareness Management System for Occupant Safety as claimed in claim 2 further including a secondary device provided as an initiation station configured to permit users to actuate the system when a particular event is present, said initiation station includes a biometric element that authenticates a user to permit said user to actuate said system.

19. The Universal Threat Awareness Management System for Occupant Safety as claimed in claim 2 wherein said at least one notification appliance includes an incident location notification appliance mounted to the interior or the exterior of the structure.

20. The Universal Threat Awareness Management System for Occupant Safety as claimed in claim 19 wherein said incident location notification appliance includes strobe lights and a speaker for broadcasting warning sounds, said incident location notification appliance adapted to provide an incident location to first responders arriving to the structure.

* * * * *